United States Patent
Dai et al.

(10) Patent No.: US 11,387,746 B2
(45) Date of Patent: Jul. 12, 2022

(54) CURRENT SOURCE INVERTER WITH BI-DIRECTIONAL SWITCHES

(71) Applicant: Wisconsin Alumni Research Foundation, Madison, WI (US)

(72) Inventors: Hang Dai, Madison, WI (US); Thomas Merlin Jahns, Madison, WI (US); Bulent Sarlioglu, Madison, WI (US); Renato Amorim Torres, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 73 days.

(21) Appl. No.: 16/354,453

(22) Filed: Mar. 15, 2019

(65) Prior Publication Data

US 2020/0295673 A1 Sep. 17, 2020

(51) Int. Cl.
*H02M 7/5387* (2007.01)
*H02M 1/08* (2006.01)
*H02M 1/00* (2006.01)

(52) U.S. Cl.
CPC ....... *H02M 7/53871* (2013.01); *H02M 1/083* (2013.01); *H02M 1/0058* (2021.05)

(58) Field of Classification Search
CPC . H02M 7/53871; H02M 1/083; H02M 1/0058
See application file for complete search history.

(56) References Cited

U.S. PATENT DOCUMENTS

| | | | |
|---|---|---|---|
| 8,130,524 B2* | 3/2012 | Lee | H02M 3/1582 363/132 |
| 9,577,530 B1* | 2/2017 | Ribarich | H02M 3/1588 |
| 2010/0067264 A1* | 3/2010 | Ohashi | H02M 5/271 363/37 |
| 2015/0097507 A1 | 4/2015 | Kim et al. | |
| 2018/0222333 A1* | 8/2018 | Khaligh | H01F 38/08 |

OTHER PUBLICATIONS

Dai et al., Development of High-Frequency WBG Power Modules with Reverse-Voltage-Blocking Capability for an Integrated Motor Drive using a Current-Source Inverter, 2018 IEEE Energy Convers. Congr. Expo, p. in press, 2018.

(Continued)

*Primary Examiner* — Nguyen Tran
(74) *Attorney, Agent, or Firm* — Bell & Manning, LLC

(57) ABSTRACT

A switching circuit includes a diode, a semiconductor switch, and a first bidirectional switch. The semiconductor switch is configured to conduct a first current from a second terminal to a third terminal of the semiconductor switch when a first on-state signal is sent to a first terminal of the semiconductor switch. An anode of the diode is connected to the second terminal of the semiconductor switch, and a cathode of the diode is connected to the third terminal of the semiconductor switch. The first bidirectional switch includes a first terminal, a second terminal connected to the anode of the diode, and a third terminal and is configured to conduct a second current from the second terminal to the third terminal or from the third terminal to the second terminal when a second on-state signal is sent to the first terminal of the first bidirectional switch.

20 Claims, 13 Drawing Sheets

(56) References Cited

OTHER PUBLICATIONS

J. W. Wu et al., "1200V, 25A bi-directional Si DMOS IGBT fabricated with fusion wafer bonding," *Proc. Int. Symp. Power Semicond. DevicesICs*, pp. 95-98, 2014.

M. Baus et al., "Fabrication of Monolithic Bidirectional Switch (MBS) devices with MOS-controlled emitter structures," *Power Semicond.Devices IC's, 2006 IEEE Int. Symp.*, pp. 1-4, 2006.

S. Chowdhury, C. W. Hitchcock, Z. Stum, R. P. Dahal, I. B. Bhat, and T. P. Chow, "Operating Principles, Design Considerations, and Experimental Characteristics of High-Voltage 4H-SiC Bidirectional IGBTs," *IEEE Trans. Electron Devices*, vol. 64, No. 3, pp. 888-896, 2017.

Umeda et al., "High Power 3-phase to 3-phase Matrix Converter Using Dual-gate GaN Bidirectional Switches," in *2018 IEEE Applied Power Electronics Conference and Exposition (APEC)*, 2018, pp. 894-897.

T. Morita et al., "650 V 3.1 mΩcm2 GaN-based monolithic bidirectional switch using normally-off gate injection transistor," in *2007 IEEE International Electron Devices Meeting*, 2007, pp. 865-868.

Lasserre,et al, "Integrated Bi-directional Sic MOSFET power switches for efficient, power dense and reliable matrix converter assembly," *WiPDA 2016—4th IEEE Work. Wide Bandgap Power Devices Appt.*, pp. 188-193, 2016.

P. Wheeler and D. Grant, "Optimised input filter design and low-loss switching techniques for a practical matrix converter," *IEE Proc.—Electr. Power Appl.*, vol. 144, No. 1, p. 53, 1997.

Hornkamp, et al, "Economac the First All-in-One IGBT Module for Matrix Converters," 2001, p. 640.

Lorenzani, et al., "CSI7: A Modified Three-Phase Current-Source Inverter for Modular Photovoltaic Applications," *IEEE Trans. Ind. Electron.*, vol. 64, No. 7, pp. 5449-5459, 2017.

W. Wang, F. Gao, Y. Yang, and F. Blaabjerg, "Operation and modulation of H7 current-source inverter with hybrid SiC and Si semiconductor switches," *IEEE J. Emerg. Sel. Top. Power Electron.*, vol. 6, No. 1, pp. 387-399, 2018.

B. Wu, High-Power Converters and AC Drives. H. 10, Wiley 2006.

\* cited by examiner

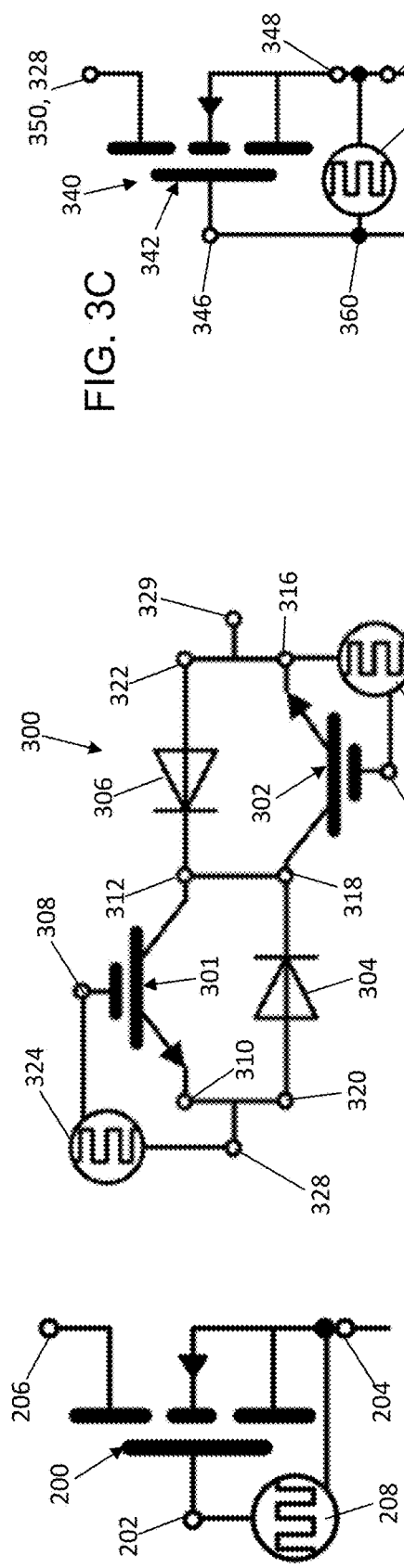
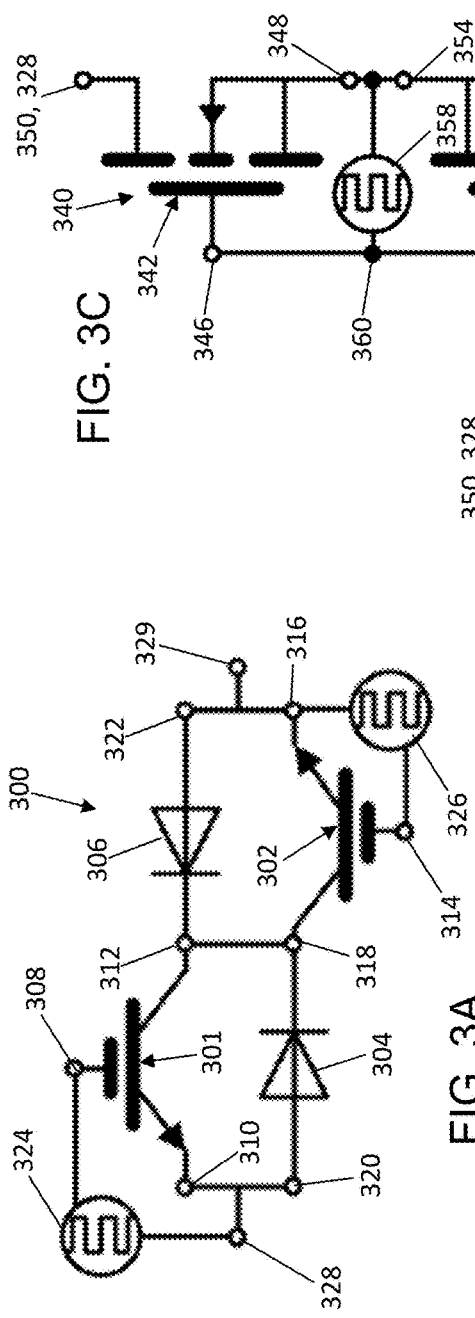
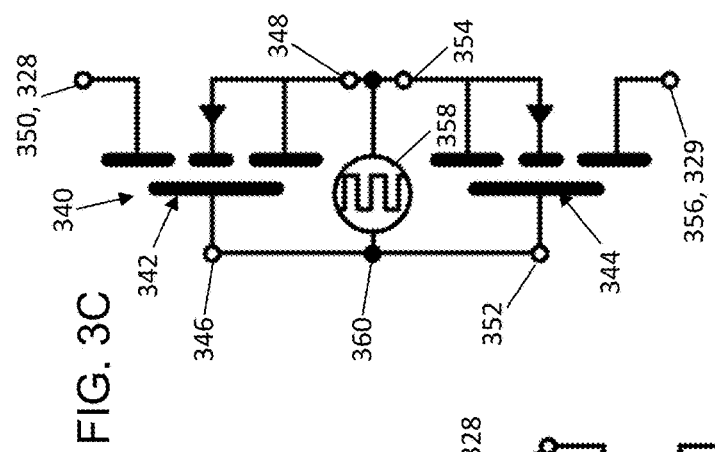
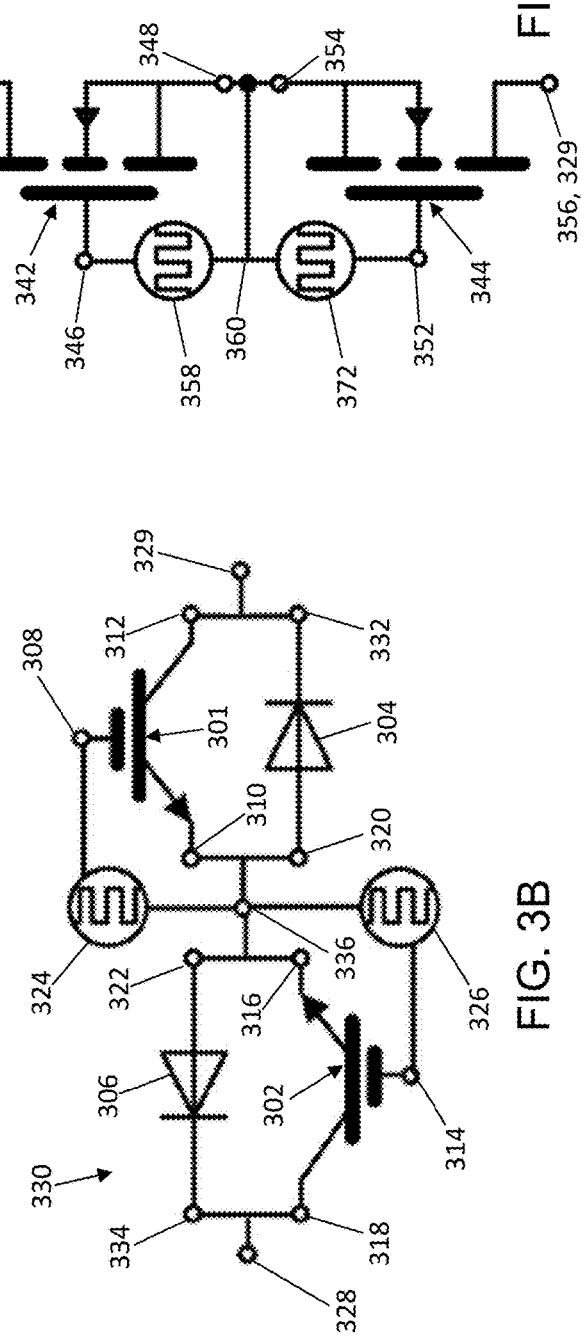
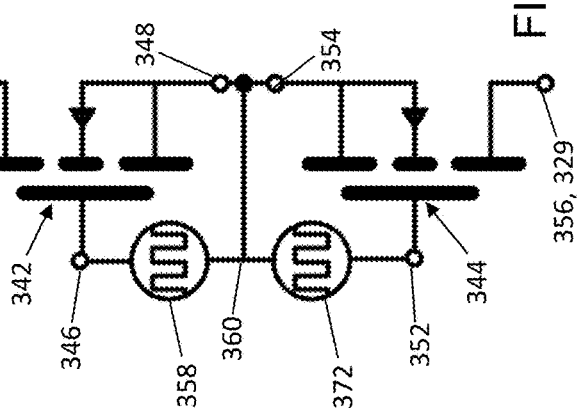

CURRENT SOURCE INVERTER WITH BI-DIRECTIONAL SWITCHES

REFERENCE TO GOVERNMENT RIGHTS

This invention was made with government support under DE-AR0000893 awarded by the US Department of Energy ARPA-E. The government has certain rights in the invention.

BACKGROUND

Current-source inverters (CSIs) using reverse-voltage-blocking (RB) switches were dominant in the early days of power electronics and are still used in some megawatt (MW)-level motor drive applications. Due to the latching characteristics of thyristors and low switching frequency capability of thyristor-based devices like gate turn-off thyristors, such CSI systems are usually very bulky. CSIs based on non-latching reverse-voltage-blocking (RB) devices can increase the CSI's switching frequency, but the high conduction loss of available silicon (Si)-based RB switches and their limited availability have prevented CSIs using RB switches from competing with voltage-source inverters (VSIs). The non-latching silicon switches developed since the 1980s including metal-oxide-semiconductor field-effect transistors (MOSFETs) and insulated-gate bipolar transistors (IGBTs) can switch tens of kilohertz (kHz) and are naturally suitable for voltage-source inverter (VSI) topologies. However, the lack of RB capability in such devices usually requires them to be in series connection with a diode to achieve RB capability, which increases the CSI's conduction loss significantly compared to the VSI which can use the switch without the series diode.

Despite the VSIs' present dominance in commercial products, VSIs in motor drive applications result in a number of undesirable features including low reliability due to use of electrolytic direct current (DC)-link capacitors, detrimental common-mode electromagnetic interference (EMI), significant cable overvoltage, increased motor loss etc. especially when using wide bandgap (WBG) power semiconductor devices. The sinusoidal output voltage and current waveforms and the use of DC-link inductors by CSIs can naturally overcome many of these VSI disadvantages at the same time.

Bidirectional (BD) switches that have RB capability with much lower conduction loss compared to the non-latching switch in series with a diode configuration is promising for realizing high efficiency CSIs. Unfortunately, a simple drop-in of BD switches in power converters can be problematic.

To successfully implement BD switches in CSIs, WBG power semiconductors are being commercialized to serve as a transition from the traditional silicon devices used today. WBG semiconductor materials have a relatively large band gap compared to conventional semiconductors. Conventional semiconductors like silicon (Si) have a bandgap in the range of 1-1.5 electron volt (eV), whereas wide-bandgap materials have bandgaps in the range of 2-4 eV.

While conventional Si-based switches are more naturally compatible with voltage source inverters (VSIs), current-source inverters (CSIs) offer features that are better-suited to take advantage of the WBG switch characteristics in future motor drive applications. Unfortunately, the type of bidirectional WBG switch that is most likely to be available in the future has compatibility problems with the traditional three-phase CSI topology that uses 6 switches (H6-CSI). The H6-CSI uses a MOSFET or IGBT in series with a diode that can block reverse voltage, but only conducts current in one polarity. The H6-CSI requires overlapping commutation time between switching events to insure that current paths are always available for the DC-link inductor and motor phase inductances in order to avoid a dangerous overvoltage.

A BD switch that conducts current in both polarities and has RB capability is a candidate for use in CSIs. BD switches could be used in an H6-CSI topology if their switching times were zero. However, due to their finite switching speeds, the requirement of overlapping gate signals, and the fact that a gated-on BD switch cannot block reverse voltage, BD switches cause significant transient interphase short-circuit current pulses when used in an H6-CSI when two switches are gated on. Such interphase short-circuit currents can damage the switches and output capacitors. Additionally, the hard switching of the H6-CSI topology increases the switching loss and generates significant high-frequency EMI noise that can lead to additional problems such as false gate triggering.

SUMMARY

In an example embodiment, a switching circuit is provided that includes, but is not limited to, a diode, a semiconductor switch, and a first bidirectional switch. The diode includes, but is not limited to, an anode and a cathode. The semiconductor switch includes, but is not limited to, a first terminal, a second terminal, and a third terminal. The semiconductor switch is configured to conduct a first current from the second terminal to the third terminal of the semiconductor switch when a first on-state signal is sent to the first terminal of the semiconductor switch. The anode of the diode is connected to the second terminal of the semiconductor switch, and the cathode of the diode is connected to the third terminal of the semiconductor switch. The first bidirectional switch includes, but is not limited to, a first terminal, a second terminal, and a third terminal. The anode of the diode is connected to the second terminal of the first bidirectional switch. The first bidirectional switch is configured to conduct a second current from the second terminal of the first bidirectional switch to the third terminal of the first bidirectional switch or from the third terminal of the first bidirectional switch to the second terminal of the first bidirectional switch when a second on-state signal is sent to the first terminal of the first bidirectional switch.

In another example embodiment, a switching circuit for a current source inverter is provided that includes, but is not limited to, a diode, a semiconductor switch, a first bidirectional switch, a first half-bridge, and a second half-bridge. The diode includes, but is not limited to, an anode and a cathode. The semiconductor switch includes, but is not limited to, a first terminal, a second terminal, and a third terminal. The semiconductor switch is configured to conduct a first current from the second terminal to the third terminal of the semiconductor switch when a first on-state signal is sent to the first terminal of the semiconductor switch. The anode of the diode is connected to the second terminal of the semiconductor switch, and the cathode of the diode is connected to the third terminal of the semiconductor switch. The first bidirectional switch includes, but is not limited to, a first terminal, a second terminal, and a third terminal. The anode of the diode is connected to the second terminal of the first bidirectional switch. The third terminal is connected to a first line. The first half-bridge includes, but is not limited to, a second bidirectional switch and a third bidirectional switch. The second bidirectional switch includes, but is not limited to, a first terminal, a second terminal, and a third terminal. The third bidirectional switch includes, but is not limited to, a first terminal, a second terminal, and a third terminal. The second bidirectional switch and the third bidirectional switch are connected in series between a second line and the first line. The second half-bridge includes, but is not limited to, a fourth bidirectional switch and a fifth bidirectional switch. The fourth bidirectional switch includes, but is not limited to, a first terminal, a second terminal, and a third terminal. The fifth bidirectional switch includes, but is not limited to, a first terminal, a second terminal, and a third terminal. The fourth bidirectional switch and the fifth bidirectional switch are connected in series between the second line and the first line. A respective bidirectional switch is configured to conduct a second current from the second terminal of the respective bidirectional switch to the third terminal of the respective bidirectional switch or from the third terminal of the respective bidirectional switch to the second terminal of the respective bidirectional switch when a second on-state signal is sent to the first terminal of the respective bidirectional switch. The second line is connected to the cathode of the diode.

In yet another example embodiment, a current source inverter is provided. The current source inverter includes, but is not limited to, an inductor, a filter, and the switching circuit connected between the inductor and the filter.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

FIG. 2 is a circuit diagram of a switch that can be included in the current source inverter of FIG. 1 in accordance with an illustrative embodiment.

FIGS. 3A-3D are circuit diagrams of bidirectional switches that can be included in the current source inverter of FIG. 1 in accordance with illustrative embodiments.

DETAILED DESCRIPTION

Figure 1:
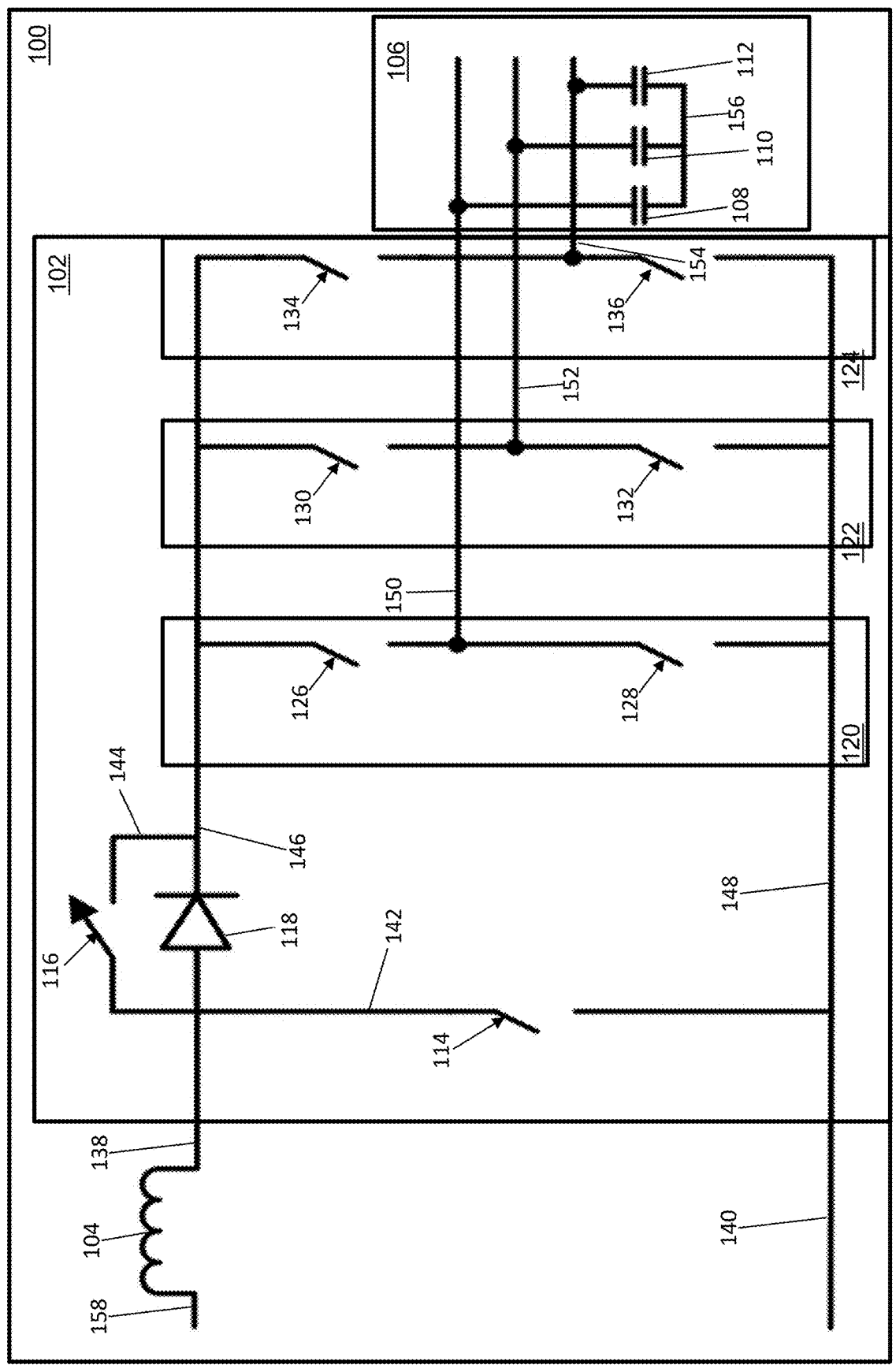
FIG. 1 is a circuit diagram of a three-phase current source inverter in accordance with an illustrative embodiment.

Referring to FIG. 1, a current source inverter 100 is shown in accordance with an illustrative embodiment. Current source inverter 100 may include an inverter switching circuit 102, an inductor 104, and a capacitive filter 106. Capacitive filter 106 may include a first capacitor 108, a second capacitor 110, and a third capacitor 112. Inverter switching circuit 102 is connected between inductor 104 and capacitive filter 106. Inverter switching circuit 102 may include a first switch 114, a second switch 116, a diode 118, a first half-bridge 120, a second half-bridge 122, and a third half-bridge 124. First half-bridge 120 may include a third switch 126 and a fourth switch 128. Second half-bridge 122 may include a fifth switch 130 and a sixth switch 132. Third half-bridge 124 may include a seventh switch 134 and an eighth switch 136.

A first bus line 138, a second bus line 140, a first switch line 142, a second switch line 144, a first bridge line 146, a second bridge line 148, a first phase line 150, a second phase line 152, a third phase line 154, a filter line 156, and a source line 158 can be used to describe connectivity between the electrical circuit elements of current source inverter 100 where the term line may indicate any type of conductor, wire, or other conduit by which electrical energy is transmitted between electrical circuit elements.

Inductor 104 may be an inductor of various types with various inductance values. As understood by a person of skill in the art, an inductor is a passive two-terminal electrical component that stores energy in a magnetic field when electric current flows through it. An inductance value for inductor 104 may be selected to carry a load current based on an application area of current source inverter 100 as understood by a person of skill in the art. Inductor 104 is connected between source line 158 that is connected to a DC source 714 (shown referring to FIG. 7) and first bus line 138. First bus line 138 and second bus line 140 provide connections to inverter switching circuit 102 to/from DC source 714.

Diode 118 may be a diode of various types such as a p-n junction type, a Schottky barrier type, etc. with various ratings. As understood by a person of skill in the art, a diode is a two-terminal electrical component that conducts current primarily in one direction from an anode to a cathode. Diode 118 is connected in series between inductor 104 and first half-bridge 120, second half-bridge 122, and third half-bridge 124. Diode 118 is further connected in series between first switch 114 and first half-bridge 120, second half-bridge 122, and third half-bridge 124 to prevent a circulating short-circuit current from flowing when the switches of first half-bridge 120, second half-bridge 122, third half-bridge 124, and first switch 114 are switched. Diode 118 is connected between first bus line 138 and first bridge line 146.

A capacitor of first capacitor 108, second capacitor 110, and third capacitor 112 is associated with each half-bridge of first half-bridge 120, second half-bridge 122, and third half-bridge 124, respectively. First capacitor 108 is connected between first phase line 150 and filter line 156. Second capacitor 110 is connected between second phase line 152 and filter line 156. Third capacitor 112 is connected between third phase line 154 and filter line 156. Each capacitor of capacitive filter 106 may be a capacitor of various types and with various ratings. As understood by a person of skill in the art, a capacitor is a passive two-terminal electrical component that stores electrical energy in an electric field and has an associated rated capacitance value. A rating of each capacitor of capacitive filter 106 may be selected to carry inductive current from alternating current (AC) load 716 (shown referring to FIG. 7) without requiring the switches of first half-bridge 120, second half-bridge 122, and third half-bridge 124 to provide a current flow-path. In alternative embodiments, other types of filters may be used based on AC load 716.

To avoid the additional voltage drop across diode 118 that would degrade the efficiency of current source inverter 100, second switch 116 is connected across diode 118 to conduct current in the same direction as diode 118. Second switch 116 may be a semiconductor switch formed of one or more of various types of semiconductors such as a MOSFET, a high electron mobility transistor (HEMT), etc. For example, referring to FIG. 2, a n-channel, enhancement mode MOSFET 200 with a gate terminal 202, a source terminal 204, and a drain terminal 206 can be used as second switch 116 when operated as a synchronous rectifier in accordance with an illustrative embodiment. As understood by a person of skill in the art, the terminals of different types of semiconductor devices may be labeled differently based on the type of switch. For example, for a MOSFET or an HEMT, a first terminal, a second terminal, and a third terminal may be referred to as a drain, a gate, and a source, respectively. Source terminal 204 is connected to the anode terminal of diode 118, and drain terminal 206 is connected to the cathode of diode 118 in accordance with an illustrative embodiment. A voltage applied to the second terminal determines a switching state of the semiconductor device, as in an on-state or as in an off-state.

Figure 7:
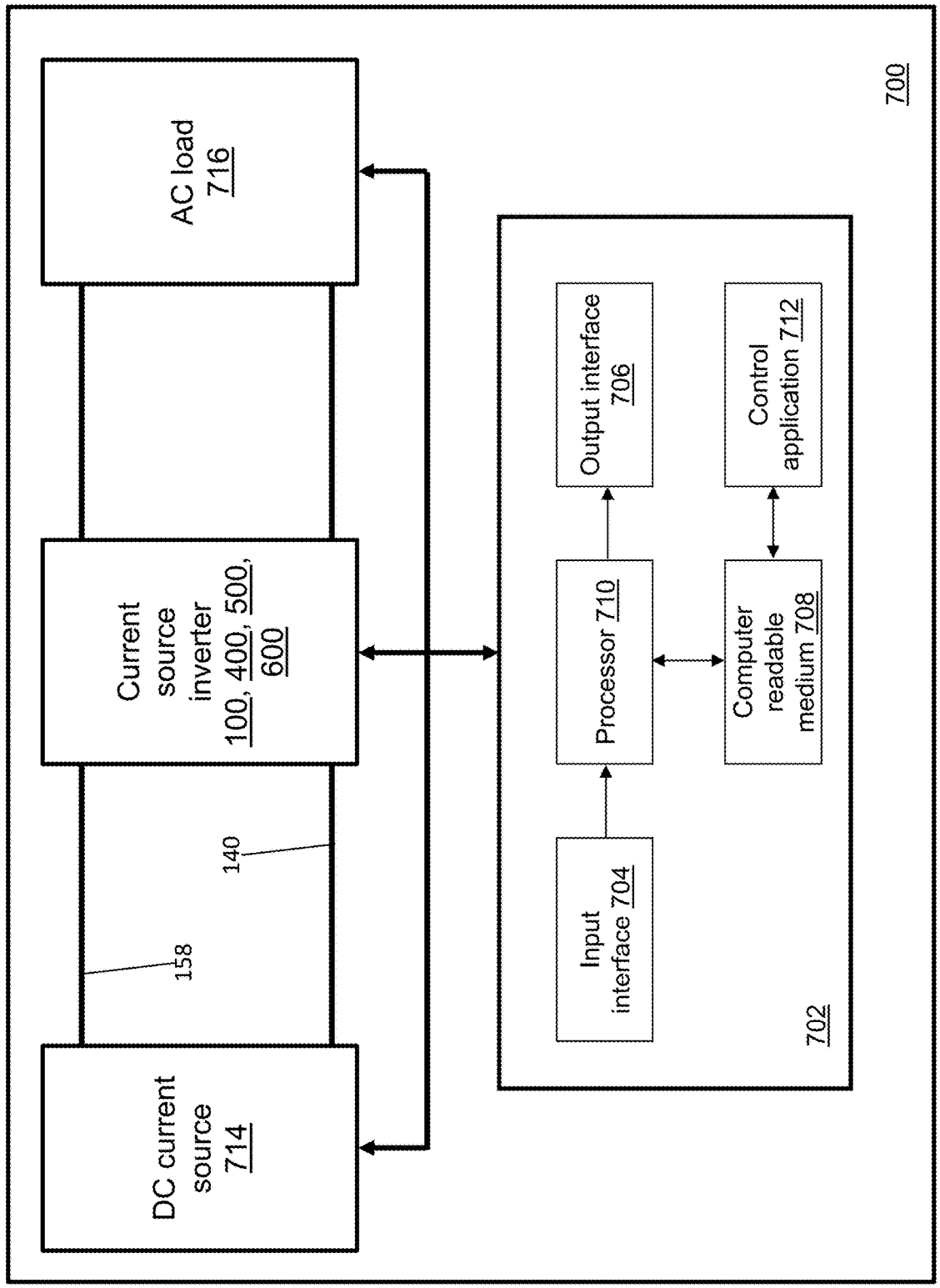
FIG. 7 is a block diagram of a power conversion system in accordance with an illustrative embodiment.

Gate terminal 202 and source terminal 204 may be connected to a pulse width modulated (PWM) signal generator 208 of a controller 702 (shown referring to FIG. 7). Drain terminal 206 may be connected to second switch line 144 that is connected to and splits from first bridge line 146. Source terminal 204 may be connected to first switch line 142 that is connected to and splits from first bus line 138. Gate terminal 202 and source terminal 204 may be connected to switch together under control of PWM signal generator 208. Second switch 116 may be in an off-state when an off-state control signal is provided by PWM signal generator 208 of controller 702 to gate terminal 202. Second switch 116 may be in an on-state when an on-state control signal is provided by PWM signal generator 208 of controller 702 to gate terminal 202 and source terminal 204. For illustration, second switch 116 may be a silicon-carbide (SiC)-MOSFET switch.

First switch 114, third switch 126, fourth switch 128, fifth switch 130, sixth switch 132, seventh switch 134, and eighth switch 136 may be bidirectional switches with controlled current flow in both polarities in addition to having reverse-voltage-blocking capability. When the bidirectional switch is in the on-state, current flows in either direction. When the bidirectional switch is in the off-state, bidirectional voltage blocking is provided.

For example, referring to FIG. 3A, a first bidirectional switch 300 is shown in accordance with an illustrative embodiment. First bidirectional switch 300 can be used as first switch 114, third switch 126, fourth switch 128, fifth switch 130, sixth switch 132, seventh switch 134, and eighth switch 136. First bidirectional switch 300 may include a first IGBT 301, a second IGBT 302, a first diode 304, and a second diode 306. First IGBT 301 may include a first gate terminal 308, a first emitter terminal 310, and a first collector terminal 312. Second IGBT 302 may include a second gate terminal 314, a second emitter terminal 316, and a second collector terminal 318. First diode 304 is connected anti-parallel across first IGBT 301 between a first diode terminal 320 and second collector terminal 318. First diode terminal 320 is tied to first emitter terminal 310 and to the anode of first diode 304. The cathode of first diode 304 is connected to second collector terminal 318. Second diode 306 is connected anti-parallel across second IGBT 302 between a second diode terminal 322 and first collector terminal 312. Second diode terminal 322 is connected to the anode of second diode 306. The cathode of second diode 306 is connected to first collector terminal 312. Second diode terminal 322 is tied to second emitter terminal 316. First collector terminal 312 is tied to second collector terminal 318. First gate terminal 308 and first emitter terminal 310 may be connected to switch together under control of a first PWM signal generator 324 of controller 702. Second gate terminal 314 and second emitter terminal 316 may be connected to switch together under control of a second PWM signal generator 326 of controller 702.

A first input/output (I/O) terminal 328 is connected between first diode terminal 320 and first emitter terminal 310. A second I/O terminal 329 is connected between second emitter terminal 316 and second diode terminal 322. First I/O terminal 328 provides a first connection to first bidirectional switch 300, and second I/O terminal 329 provides a second connection to first bidirectional switch 300. Current may flow through first bidirectional switch 300 from first I/O terminal 328 to second I/O terminal 329 or vice versa to provide the current flow in both polarities. First bidirectional switch 300 may be in an off-state when an off-state control signal is provided by PWM signal generator 324 of controller 702 to first gate terminal 308 and second gate terminal 314. First bidirectional switch 300 may be in a first on-state when an on-state control signal is provided by PWM signal generator 324 of controller 702 to first gate terminal 308 such that current flows from second I/O terminal 329 to first I/O terminal 328. First bidirectional switch 300 may be in a second on-state when an on-state control signal is provided by PWM signal generator 326 of controller 702 to second gate terminal 314 such that current flows from first I/O terminal 328 to second I/O terminal 329.

As another example, referring to FIG. 3B, a second bidirectional switch 330 is shown in accordance with an illustrative embodiment. Second bidirectional switch 330 can be used as first switch 114, third switch 126, fourth switch 128, fifth switch 130, sixth switch 132, seventh switch 134, and eighth switch 136. Second bidirectional switch 330 may include first IGBT 301, second IGBT 302, first diode 304, and second diode 306. First diode 304 is connected anti-parallel across first IGBT 301 between a first diode terminal 320 and a third diode terminal 332. First diode terminal 320 is connected to the anode of first diode 304. The cathode of first diode 304 is connected to third diode terminal 332. First diode terminal 320 is tied to first emitter terminal 310. Third diode terminal 332 is tied to first collector terminal 312. Second diode 306 is connected anti-parallel across second IGBT 302 between second diode terminal 322 and a fourth diode terminal 334. Second diode terminal 322 is connected to the anode of second diode 306. The cathode of second diode 306 is connected to fourth diode terminal 334. Second diode terminal 322 is tied to second emitter terminal 316. Fourth diode terminal 334 is tied to second collector terminal 318. First gate terminal 308 and first emitter terminal 310 may be connected to switch together under control of first PWM signal generator 324 of controller 702. Second gate terminal 314 and second emitter terminal 316 may be connected to switch together under control of second PWM signal generator 326 of controller 702. First PWM signal generator 324 also may be connected to second emitter terminal 316, first diode terminal 320, and second diode terminal 322 at a common terminal 336. Second PWM signal generator 326 also may be connected to first emitter terminal 310, first diode terminal 320, and second diode terminal 322 at common terminal 336.

First I/O terminal 328 is connected between fourth diode terminal 334 and second collector terminal 318. Second I/O terminal 329 is connected between third diode terminal 332 and first collector terminal 312. First I/O terminal 328 provides the first connection to second bidirectional switch 330, and second I/O terminal 329 provides the second connection to second bidirectional switch 330. Current may flow through second bidirectional switch 330 from first I/O terminal 328 to second I/O terminal 329 or vice versa to provide the current flow in both polarities. Second bidirectional switch 330 may be in an off-state when an off-state control signal is provided by first PWM signal generator 324 to first gate terminal 308 and by second PWM signal generator 326 to second gate terminal 314. Second bidirectional switch 330 may be in a first on-state when an on-state control signal is provided by PWM signal generator 324 of controller 702 to first gate terminal 308 such that current flows from second I/O terminal 329 to first I/O terminal 328. Second bidirectional switch 330 may be in a second on-state when an on-state control signal is provided by PWM signal generator 326 of controller 702 to second gate terminal 314 such that current flows from first I/O terminal 328 to second I/O terminal 329.

As yet another example, referring to FIG. 3C, a third bidirectional switch 340 is shown in accordance with an illustrative embodiment. Third bidirectional switch 340 can be used as first switch 114, third switch 126, fourth switch 128, fifth switch 130, sixth switch 132, seventh switch 134, and eighth switch 136. Third bidirectional switch 340 may include a first MOSFET 342 and a second MOSFET 344. First MOSFET 342 may include a first gate terminal 346, a first source terminal 348, and a first drain terminal 350. Second MOSFET 344 may include a second gate terminal 352, a second source terminal 354, and a second drain terminal 356. First gate terminal 346, second gate terminal 352, first source terminal 348, and second source terminal 354 may be connected to switch together under control of a first PWM signal generator 358 of controller 702. First PWM signal generator 358 is provided between a signal terminal 360 and first source terminal 348 and second source terminal 354.

First drain terminal 350 is also first I/O terminal 328, and second drain terminal 356 is also second I/O terminal 329. First I/O terminal 328 provides the first connection to third bidirectional switch 340, and second I/O terminal 329 provides the second connection to second bidirectional switch 330. Current may flow through third bidirectional switch 340 from first I/O terminal 328 to second I/O terminal 329 or vice versa to provide the current flow in both polarities. Third bidirectional switch 340 330 may be in an off-state when an off-state control signal is provided by first PWM signal generator 358 to first gate terminal 346 and to second gate terminal 352. Third bidirectional switch 340 may be in an on-state when an on-state control signal is provided by PWM signal generator 358 of controller 702 to first gate terminal 346 and to second gate terminal 352 such that current flows from second I/O terminal 329 to first I/O terminal 328 based on a polarity of the current.

As still another example, referring to FIG. 3D, a fourth bidirectional switch 370 is shown in accordance with an illustrative embodiment. Fourth bidirectional switch 370 can be used as first switch 114, third switch 126, fourth switch 128, fifth switch 130, sixth switch 132, seventh switch 134, and eighth switch 136. Fourth bidirectional switch 370 may include first MOSFET 342 and second MOSFET 344. First gate terminal 346, first source terminal 348, and second source terminal 354 may be connected to switch together under control of first PWM signal generator 358 of controller 702. Second gate terminal 352, first source terminal 348, and second source terminal 354 may be connected to switch together under control of a second PWM signal generator 372 of controller 702. Signal terminal 360 is connected between first PWM signal generator 358 and second PWM signal generator 372 and to first source terminal 348 and second source terminal 354.

First drain terminal 350 is also first I/O terminal 328, and second drain terminal 356 is also second I/O terminal 329. First I/O terminal 328 provides the first connection to fourth bidirectional switch 370, and second I/O terminal 329 provides the second connection to fourth bidirectional switch 370. Current may flow through fourth bidirectional switch 370 from first I/O terminal 328 to second I/O terminal 329 or vice versa to provide the current flow in both polarities. Fourth bidirectional switch 370 may be in an off-state when an off-state control signal is provided by first PWM signal generator 358 to first gate terminal 346 and by second PWM signal generator 372 to second gate terminal 352. Fourth bidirectional switch 370 may be in a first on-state when an on-state control signal is provided by PWM signal generator 358 of controller 702 to first gate terminal 346 such that current flows from first I/O terminal 328 to second I/O terminal 329. Fourth bidirectional switch 370 may be in a second on-state when an on-state control signal is provided by PWM signal generator 372 of controller 702 to second gate terminal 352 such that current flows from second I/O terminal 329 to first I/O terminal 328.

The switches of FIGS. 2 and 3A-3F are merely examples of a semiconductor switch and bidirectional switches. For further reference, example semiconductor switches and bidirectional switches are described in H. Dai, T. M. Jahns, R. A. Torres, M. Liu, B. Sarlioglu, and S. Chang, "Development of High-Frequency WBG Power Modules with Reverse-Voltage-Blocking Capability for an Integrated Motor Drive using a Current-Source Inverter," 2018 IEEE Energy Conyers. Congr. Expo, pp. 1808-1815, 2018; J. W. Wu et al., "1200V, 25A bidirectional Si DMOS IGBT fabricated with fusion wafer bonding," Proc. Int. Symp. Power Semicond. Devices ICs, pp. 95-98, 2014; M. Baus et al., "Fabrication of Monolithic Bidirectional Switch (MBS) devices with MOS-controlled emitter structures," Power Semicond. Devices IC's, 2006 IEEE Int. Symp., pp. 1-4, 2006; S. Chowdhury, C. W. Hitchcock, Z. Stum, R. P. Dahal, I. B. Bhat, and T. P. Chow, "Operating Principles, Design Considerations, and Experimental Characteristics of High-Voltage 4H-SiC Bidirectional IGBTs," IEEE Trans. Electron Devices, vol. 64, no. 3, pp. 888-896, 2017; H. Umeda, Y. Yamada, K. Asanuma, F. Kusama, and Y. Kinoshita, "High Power 3-phase to 3-phase Matrix Converter Using Dual-gate GaN Bidirectional Switches," in 2018 IEEE Applied Power Electronics Conference and Exposition (APEC), 2018, pp. 894-897; T. Morita et al., "650 V 3.1 mΩm2 GaN-based monolithic bidirectional switch using normally-off gate injection transistor," in 2007 IEEE International Electron Devices Meeting, 2007, pp. 865-868; P. Wheeler and D. Grant, "Optimised input filter design and low-loss switching techniques for a practical matrix converter," IEE Proc.—Electr. Power Appl., vol. 144, no. 1, p. 53, 1997; and M. Hornkamp, M. Loddenkotter, M. Munzer, O. Simon, and M. Bruckmann, "ECONOMAC THE FIRST ALL-IN-ONE IGBT MODULE FOR MATRIX CONVERTERS," 2001, p. 640.

A gate terminal and/or a source terminal of first switch 114 (e.g., first gate terminal 346 and second gate terminal 352 of third bidirectional switch 340) may be connected to a PWM signal generator (e.g., first PWM signal generator 358 of third bidirectional switch 340). The first connection of first switch 114 (e.g., first I/O terminal 328 of third bidirectional switch 340) may be connected to first bus line 138, and the second connection of first switch 114 (e.g., second I/O terminal 329 of third bidirectional switch 340) may be connected to second bus line 140. For illustration, first switch 114 may be implemented using gallium nitride HEMTs (GaN-HEMTs) or SiC-MOSFET transistors.

A gate terminal and/or a source terminal of third switch 126 (e.g., first gate terminal 346 and second gate terminal 352 of third bidirectional switch 340) may be connected to a PWM signal generator (e.g., first PWM signal generator 358 of third bidirectional switch 340). The first connection of third switch 126 (e.g., first I/O terminal 328 of third bidirectional switch 340) may be connected to first bridge line 146, and the second connection of third switch 126 (e.g., second I/O terminal 329 of third bidirectional switch 340) may be connected to first phase line 150. For illustration, third switch 126 may be implemented using GaN-HEMTs or SiC-MOSFET transistors.

A gate terminal and/or a source terminal of fourth switch 128 (e.g., first gate terminal 346 and second gate terminal 352 of third bidirectional switch 340) may be connected to a PWM signal generator (e.g., first PWM signal generator 358 of third bidirectional switch 340). The first connection of fourth switch 128 (e.g., first I/O terminal 328 of third bidirectional switch 340) may be connected to first phase line 150, and the second connection of fourth switch 128 (e.g., second I/O terminal 329 of third bidirectional switch 340) may be connected to second bridge line 148. For illustration, fourth switch 128 may be implemented using GaN-HEMTs or SiC-MOSFET transistors.

A gate terminal and/or a source terminal of fifth switch 130 (e.g., first gate terminal 346 and second gate terminal 352 of third bidirectional switch 340) may be connected to a PWM signal generator (e.g., first PWM signal generator 358 of third bidirectional switch 340). The first connection of fifth switch 130 (e.g., first I/O terminal 328 of third bidirectional switch 340) may be connected to first bridge line 146, and the second connection of fifth switch 130 (e.g., second I/O terminal 329 of third bidirectional switch 340) may be connected to second phase line 152. For illustration, fifth switch 130 may be implemented using GaN-HEMTs or SiC-MOSFET transistors.

A gate terminal and/or a source terminal of sixth switch 132 (e.g., first gate terminal 346 and second gate terminal 352 of third bidirectional switch 340) may be connected to a PWM signal generator (e.g., first PWM signal generator 358 of third bidirectional switch 340). The first connection of sixth switch 132 (e.g., first I/O terminal 328 of third bidirectional switch 340) may be connected to second phase line 152, and the second connection of sixth switch 132 (e.g., second I/O terminal 329 of third bidirectional switch 340) may be connected to second bridge line 148. For illustration, sixth switch 132 may be implemented using GaN-HEMTs or SiC-MOSFET transistors.

A gate terminal and/or a source terminal of seventh switch 134 (e.g., first gate terminal 346 and second gate terminal 352 of third bidirectional switch 340) may be connected to a PWM signal generator (e.g., first PWM signal generator 358 of third bidirectional switch 340). The first connection of seventh switch 134 (e.g., first I/O terminal 328 of third bidirectional switch 340) may be connected to first bridge line 146, and the second connection of seventh switch 134 (e.g., second I/O terminal 329 of third bidirectional switch 340) may be connected to third phase line 154. For illustration, seventh switch 134 may be implemented using GaN-HEMTs or SiC-MOSFET transistors.

A gate terminal and/or a source terminal of eighth switch 136 (e.g., first gate terminal 346 and second gate terminal 352 of third bidirectional switch 340) may be connected to a PWM signal generator (e.g., first PWM signal generator 358 of third bidirectional switch 340). The first connection of eighth switch 136 (e.g., first I/O terminal 328 of third bidirectional switch 340) may be connected to third phase line 154, and the second connection of eighth switch 136 (e.g., second I/O terminal 329 of third bidirectional switch 340) may be connected to second bridge line 148. For illustration, eighth switch 136 may be implemented using GaN-HEMTs or SiC-MOSFET transistors.

First phase line 150, second phase line 152, and third phase line 154 are connected between the pair of switches of first half-bridge 120, second half-bridge 122, and third half-bridge 124, respectively, and to AC load 716.

Current source inverter 100 converts an input DC from DC source 714 on source line 158 to a three-phase current output signal with a first phase current signal output on first phase line 150, with a second phase current signal output on second phase line 152, and with a third phase current signal output on third phase line 154. Capacitive filter 106 may be configured to reduce voltage spikes by reducing a rate of rise and fall of the first phase current signal, the second phase current signal, and the third phase current signal. First phase line 150, second phase line 152, and third phase line 154 may be connected to provide the three-phase current output signal to AC load 716 such as an induction motor.

Figure 4:
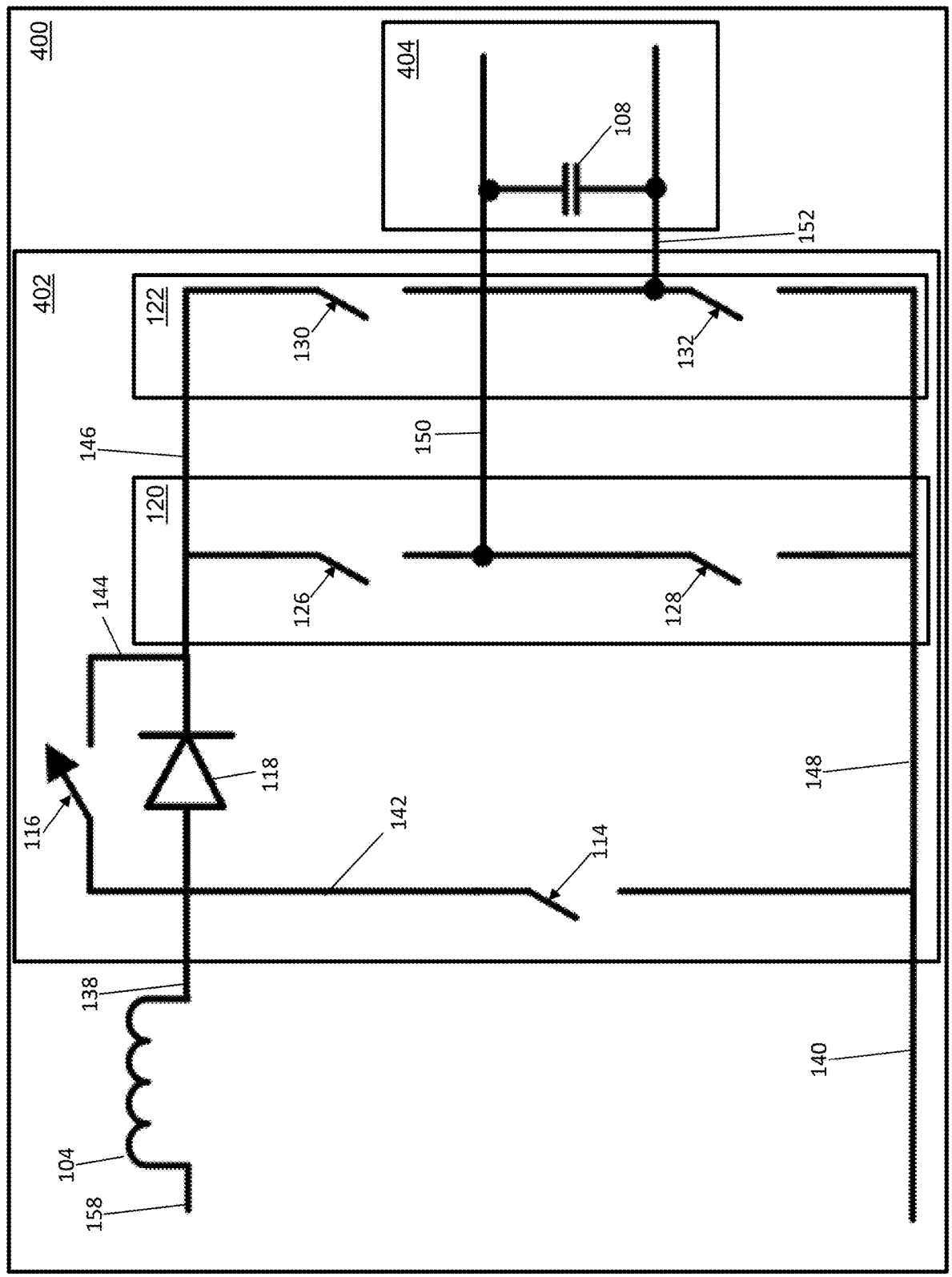
FIG. 4 is a circuit diagram of a single-phase current source inverter in accordance with an illustrative embodiment.

Current source inverter 100 may be modified to support a greater or a fewer number of phases of the current output signal. For example, referring to FIG. 4, a second current source inverter 400 is shown in accordance with an illustrative embodiment. Second current source inverter 400 is similar to current source inverter 100 except that second current source inverter 400 generates a single-phase current output signal instead of the three-phase current output signal from current source inverter 100. Second current source inverter 400 may include a second switching circuit 402, inductor 104, and a second capacitive filter 404. Second capacitive filter 404 may include first capacitor 108. Second switching circuit 402 is connected between inductor 104 and second capacitive filter 404. Second switching circuit 402 may include first switch 114, second switch 116, diode 118, first half-bridge 120, and second half-bridge 122. First capacitor 108 is connected between first phase line 150 and second phase line 152.

Second current source inverter 400 converts the input DC from DC source 714 on source line 158 to a single-phase current output signal output on first phase line 150. Second capacitive filter 404 may be configured to reduce voltage spikes by reducing a rate of rise and fall of the first phase current signal. First phase line 150 may be connected to provide the single-phase current output signal to AC load 716.

Figure 5:
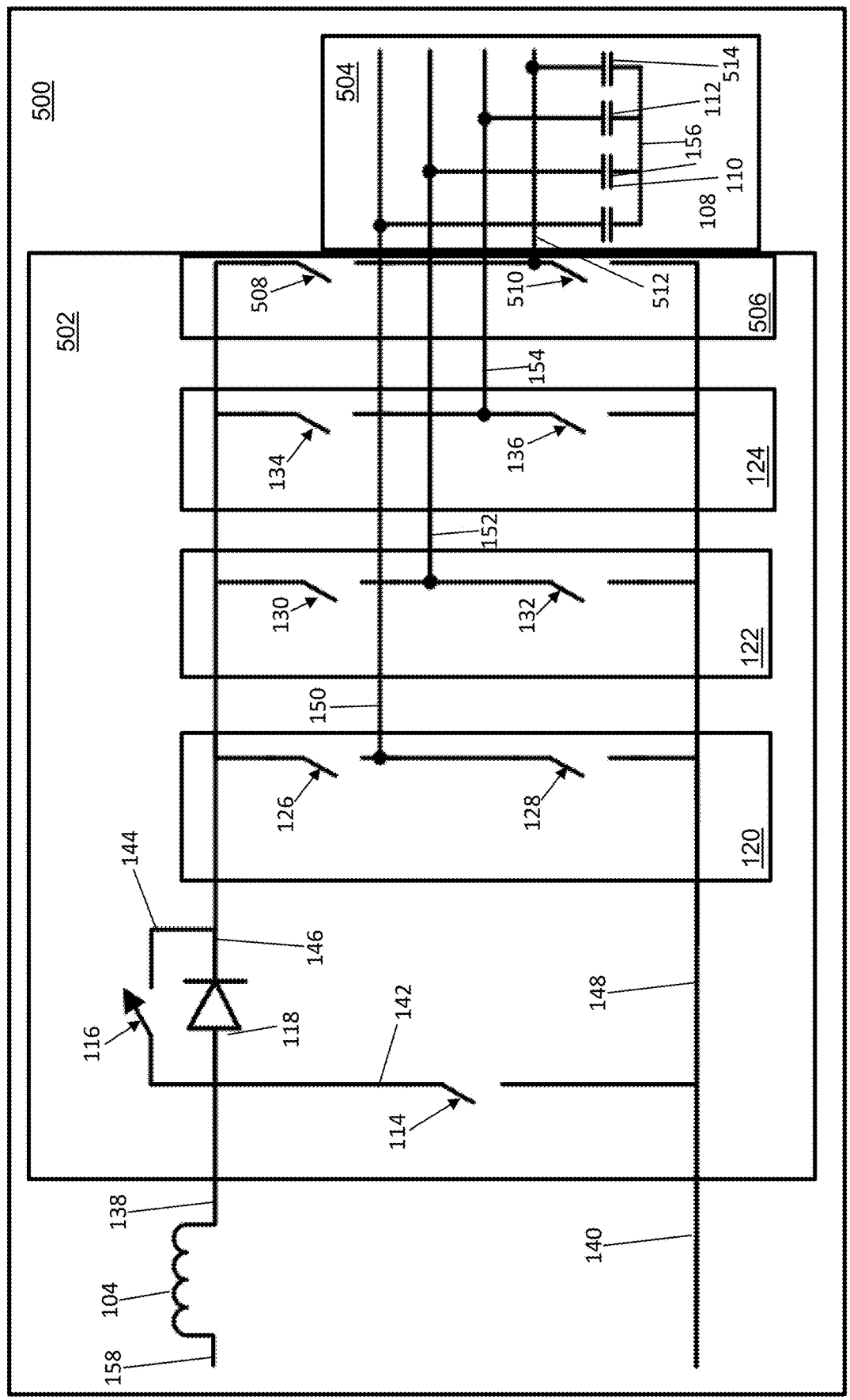
FIG. 5 is a circuit diagram of a four-phase current source inverter in accordance with an illustrative embodiment.

As another example, referring to FIG. 5, a third current source inverter 500 is shown in accordance with an illustrative embodiment. Third current source inverter 500 may be similar to current source inverter 100 except that third current source inverter 400 generates a four-phase current output signal instead of the three-phase current output signal from current source inverter 100. Third current source inverter 500 may include a third switching circuit 502, inductor 104, and a third capacitive filter 504. Third capacitive filter 504 may include first capacitor 108, second capacitor 110, third capacitor 112, and a fourth capacitor 514. Third switching circuit 502 is connected between inductor 104 and third capacitive filter 504. Third switching circuit 502 may include first switch 114, second switch 116, diode 118, first half-bridge 120, second half-bridge 122, third half-bridge 124, and a fourth half-bridge 506. Fourth half-bridge 506 may include a ninth switch 508 and a tenth switch 510. Fourth capacitor 514 is connected between a fourth phase line 512 and filter line 156.

A gate terminal and/or a source terminal of ninth switch 508 (e.g., first gate terminal 346 and second gate terminal 352 of third bidirectional switch 340) may be connected to a PWM signal generator (e.g., first PWM signal generator 358 of third bidirectional switch 340). The first connection of ninth switch 508 (e.g., first I/O terminal 328 of third bidirectional switch 340) may be connected to first bridge line 146, and the second connection of ninth switch 508 (e.g., second I/O terminal 329 of third bidirectional switch 340) may be connected to fourth phase line 512. For illustration, ninth switch 508 may be a SiC-MOSFET switch.

A gate terminal and/or a source terminal of tenth switch 510 (e.g., first gate terminal 346 and second gate terminal 352 of third bidirectional switch 340) may be connected to a PWM signal generator (e.g., first PWM signal generator 358 of third bidirectional switch 340). The first connection of tenth switch 510 (e.g., first I/O terminal 328 of third bidirectional switch 340) may be connected to fourth phase line 512, and the second connection of tenth switch 510 (e.g., second I/O terminal 329 of third bidirectional switch 340) may be connected to second bridge line 148. For illustration, tenth switch 510 may be a SiC-MOSFET switch.

Third current source inverter 500 converts the input DC from DC source 714 on source line 158 to a four-phase current output signal with first phase current signal output on first phase line 150, with second phase current signal output on second phase line 152, and with third phase current signal output on third phase line 154, and with a fourth phase current signal output on fourth phase line 512. Fourth capacitive filter 504 may be configured to reduce voltage spikes by reducing a rate of rise and fall of the first phase current signal, the second phase current signal, the third phase current signal, and the fourth phase current signal. First phase line 150, second phase line 152, third phase line 154, and fourth phase line 512 may be connected to provide the four-phase current output signal to AC load 716.

Figure 6:
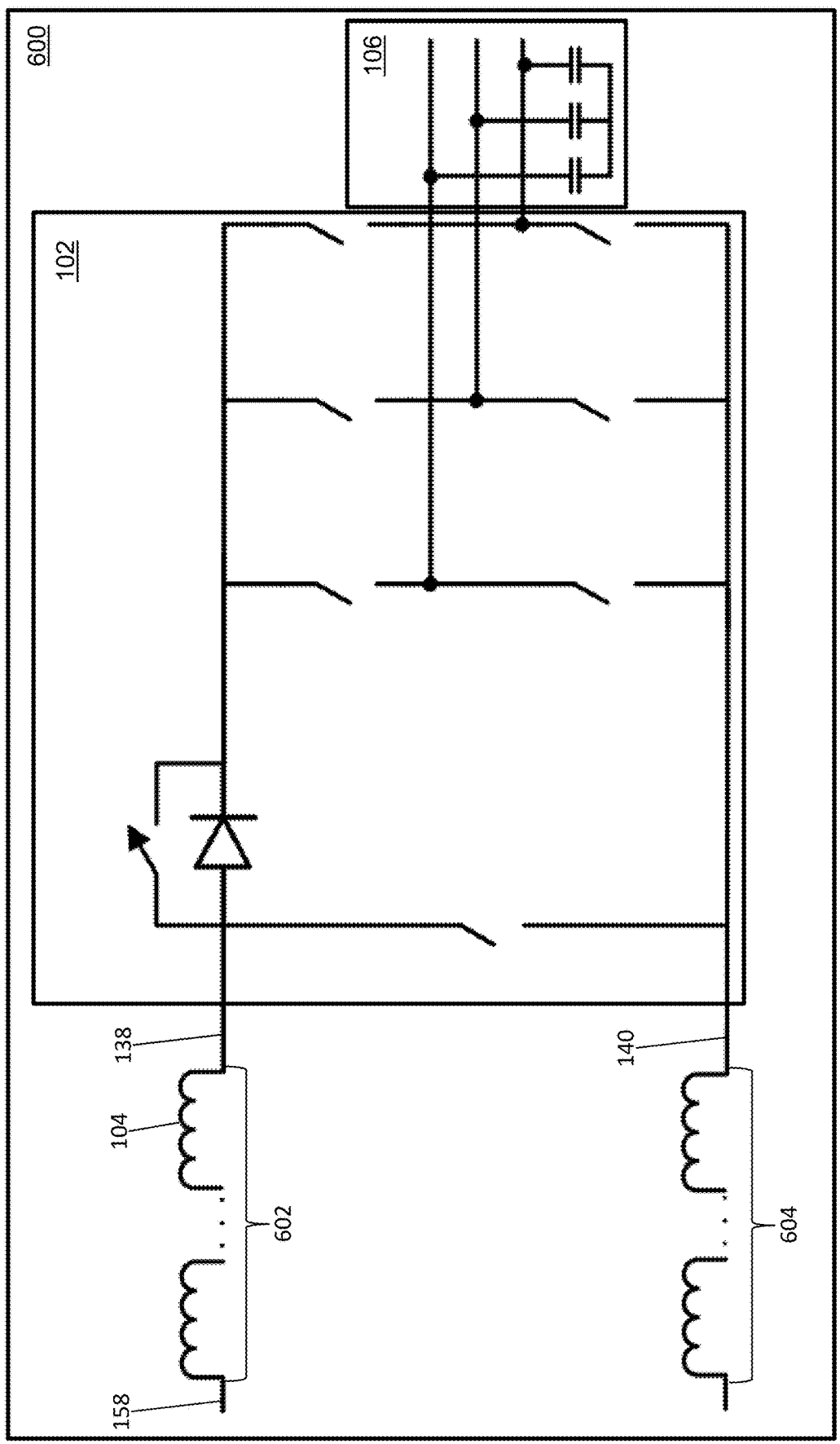
FIG. 6 is a circuit diagram of the three-phase current source inverter of FIG. 1 with a plurality of inductors in the DC-link in accordance with an illustrative embodiment.

Referring to FIG. 6, a fourth current source inverter 600 is shown in accordance with an illustrative embodiment. Fourth current source inverter 600 may be similar to current source inverter 100 except that fourth current source inverter 600 may include a first plurality of inductors 602 and a second plurality of inductors 604. The first plurality of inductors 602 are connected in series on source line 158 between DC source 714 and inverter switching circuit 102 (second switching circuit 402 or third switching circuit 502, etc.). Inductor 104 may be one of the first plurality of inductors 602. Any number of inductors may be included in the first plurality of inductors 602. Additionally, the second plurality of inductors 604 are connected in series on second bus line 140 between DC source 714 and inverter switching circuit 102 (second switching circuit 402 or third switching circuit 502, etc.). Any number of inductors may be included in the second plurality of inductors 604.

Referring to FIG. 7, a block diagram of a power conversion system 700 is shown in accordance with an illustrative embodiment. Power conversion system 700 may include controller 702, DC source 714, AC load 716, and one or more of current source inverter 100, second current source inverter 400, third current source inverter 500, fourth current source inverter 600, etc. For example, DC source 714 may be a DC current source or a current source rectifier. Controller 702 may be electrically connected to DC source 714 and to AC load 716 to receive voltage, current, and/or power values used to define the parameters that control the energy transfer between DC source 714 and AC load 716 through current source inverter 100, second current source inverter 400, third current source inverter 500, fourth current source inverter 600, etc. Controller 702 is also electrically connected to current source inverter 100, second current source inverter 400, third current source inverter 500, and fourth current source inverter 600 to receive a value of the DC-link current, for example, as well as to provide the gating signals. Current source inverter 100, second current source inverter 400, third current source inverter 500, and fourth current source inverter 600 are also connected to controller 702 that controls transmission of the on-state switching signal or the off-state switching signal to first switch 114, second switch 116, third switch 126, fourth switch 128, fifth switch 130, sixth switch 132, seventh switch 134, and eighth switch 136. The voltage, current, and/or power values may be received for each switching frequency interval, also referred to herein as a switching period, or may be received less frequently or more frequently depending on the dynamic needs of power conversion system 700.

Controller 702 may include an input interface 704, an output interface 706, a computer-readable medium 708, a processor 710, and a control application 712. Fewer, different, and additional components may be incorporated into controller 702. For example, controller 702 may include a communication interface (not shown). The communication interface provides an interface for receiving and transmitting data between devices using various protocols, transmission technologies, and media as understood by those skilled in the art. The communication interface may support communication using various transmission media that may be wired and/or wireless.

Input interface 704 provides an interface for receiving information from a user or from other devices for entry into controller 702 as understood by those skilled in the art. Input interface 704 may interface with various input technologies including, but not limited to, a keyboard, a mouse, a display, a track ball, a keypad, one or more buttons, etc. to allow the user to enter information into controller 702 or to make selections in a user interface displayed on the display. The same interface may support both input interface 704 and output interface 706. Controller 702 may have one or more input interfaces that use the same or a different input interface technology. Additional inputs through input interface 704 may include the voltage, current, and/or power values received from DC source 714 and/or AC load 716.

Output interface 706 provides an interface for outputting information for review by a user of controller 702 and for input to another device. For example, output interface 706 may interface with various output technologies including, but not limited to, the display. Controller 702 may have one or more output interfaces that use the same or a different interface technology. Additional outputs through output interface 706 from controller 702 may be the switching signals to current source inverter 100, second current source inverter 400, third current source inverter 500, fourth current source inverter 600, etc., for example, by one or more of the PWM signal generators to each switch depending on the embodiment.

Computer-readable medium 708 is an electrical holding place or storage for information so the information can be accessed by processor 710 as understood by those skilled in the art. Computer-readable medium 708 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Controller 702 may have one or more computer-readable media that use the same or a different memory media technology. For example, computer-readable medium 708 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Controller 702 also may have one or more drives that support the loading of a memory media such as a CD, DVD, an external hard drive, etc. One or more external hard drives further may be connected to controller 702 using the communication interface.

Processor 710 executes instructions as understood by those skilled in the art. The instructions may be carried out by a special purpose computer, logic circuits, or hardware circuits. Processor 710 may be implemented, for example, as a field programmable gate array. Processor 710 may be implemented in hardware and/or firmware. Processor 710 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 710 operably couples with input interface 704, with output interface 706, and with computer-readable medium 708 to receive, to send, and to process information. Processor 710 may retrieve a set of instructions from a permanent memory device and copy the instructions in an executable form to a temporary memory device that is generally some form of RAM. Controller 702 may include a plurality of processors that use the same or a different processing technology.

Control application 712 performs operations associated with implementing some or all of the control of current source inverter 100, second current source inverter 400, third current source inverter 500, fourth current source inverter 600, etc. The operations may be implemented using hardware, firmware, software, or any combination of these methods. Referring to the example embodiment of FIG. 1, control application 712 is implemented in software (comprised of computer-readable and/or computer-executable instructions) stored in computer-readable medium 708 and accessible by processor 710 for execution of the instructions that embody the operations of control application 712. Control application 712 may be written using one or more programming languages, assembly languages, scripting languages, etc.

Figure 8A:
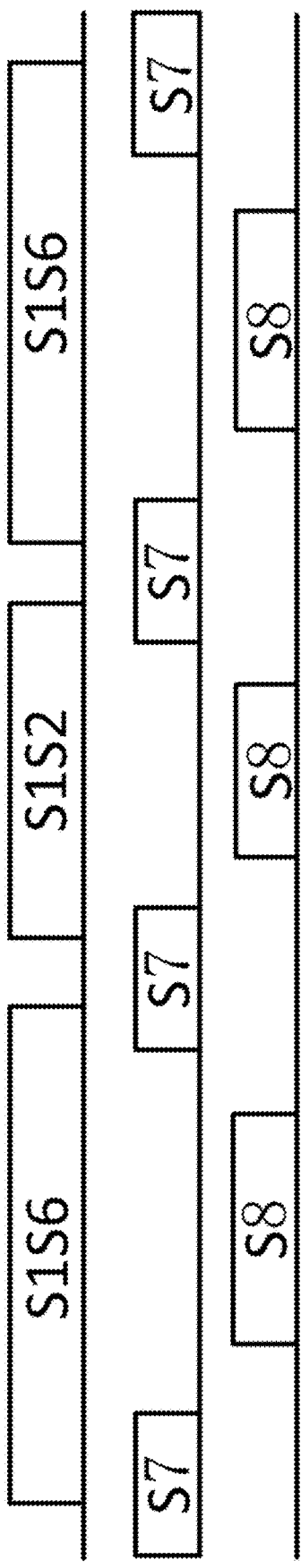
FIGS. 8A-8F are control signal time period snapshots for the current source inverter of FIG. 1 in accordance with an illustrative embodiment.
Figure 8B:
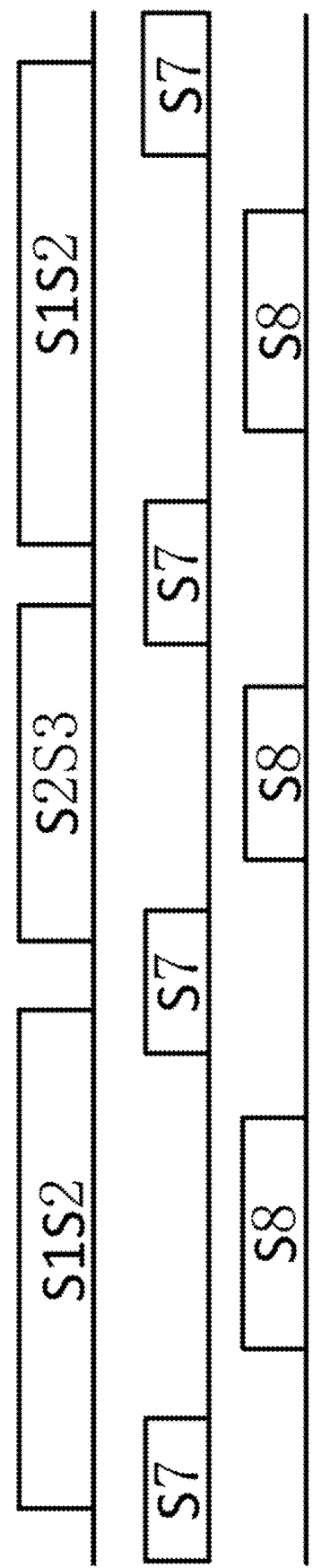
Figure 8C:
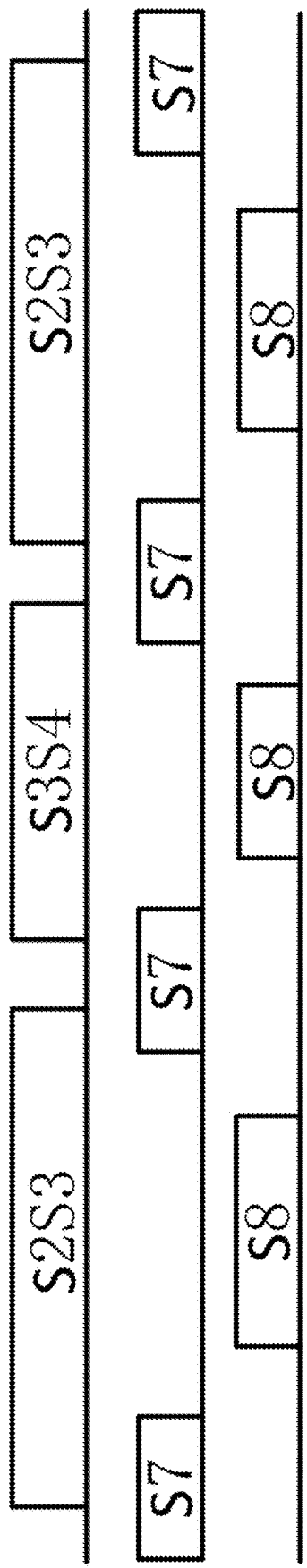
Figure 8D:
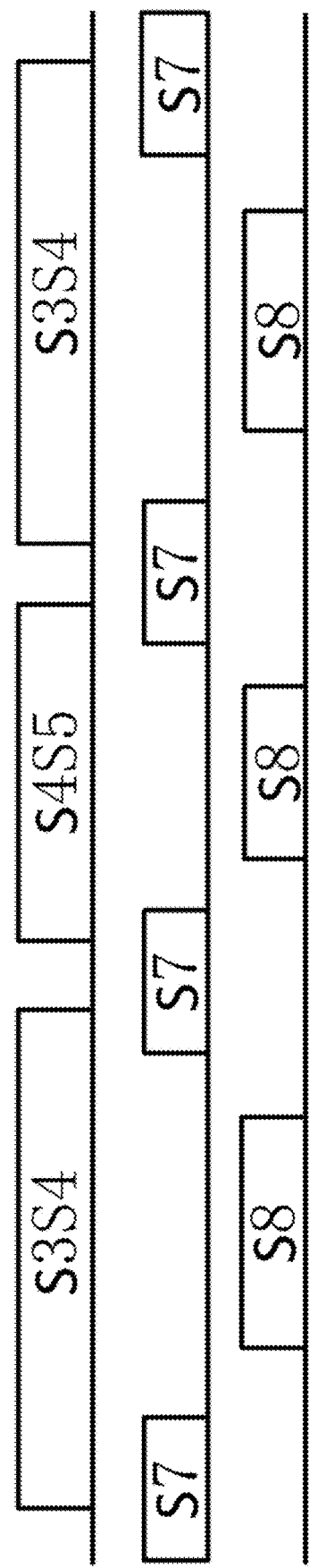
Figure 8E:
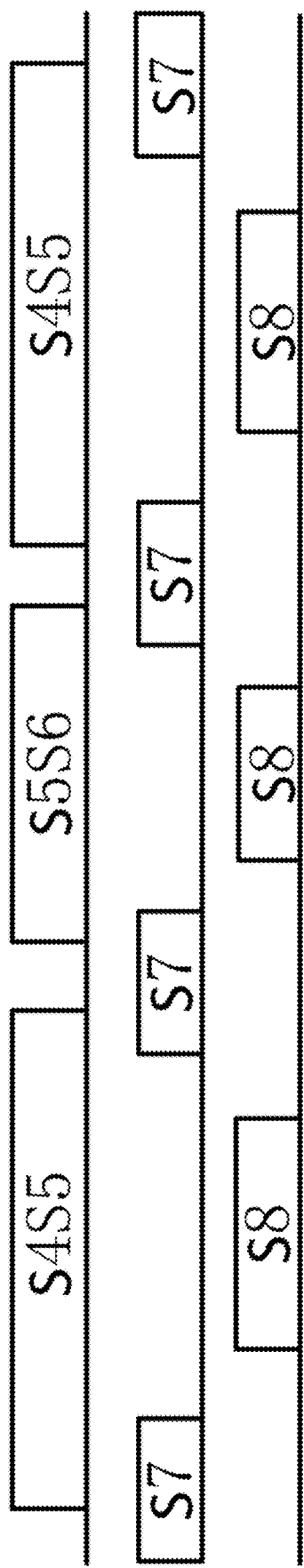
Figure 8F:
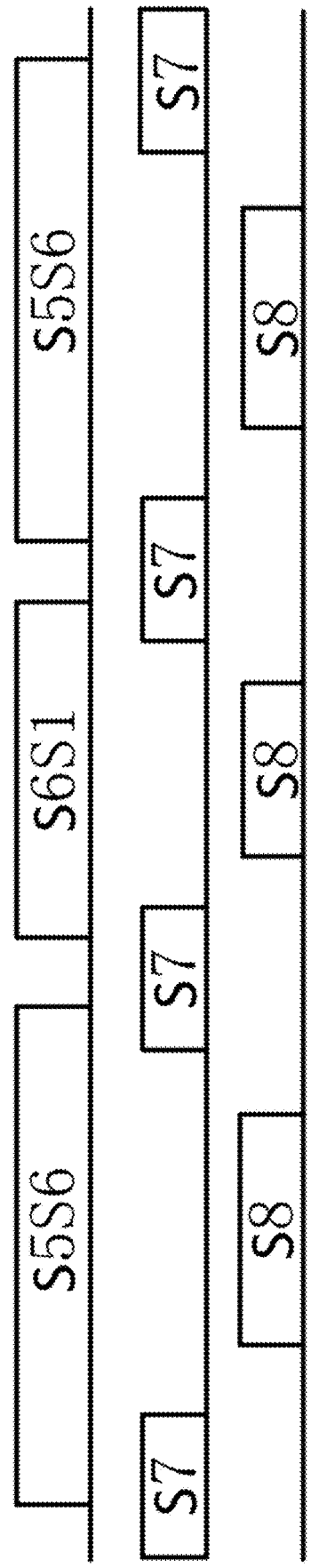

Referring to FIGS. 8A-8F, control signal time period snapshots for current source inverter 100 are shown in accordance with an illustrative embodiment. Control application 712 implements a control algorithm that operates current source inverter 100 from a sector I to a sector VI, and back to sector I in a continuous loop to continually response to DC source 714 and/or AC load 716. FIG. 8A represents sector I. FIG. 8B represents sector II. FIG. 8C represents sector III. FIG. 8D represents sector IV. FIG. 8E represents sector V. FIG. 8F represents sector VI. Of course, when current source inverter 100 implements a fewer or a greater number of phase currents, there are a fewer or a greater number of sectors. For example, second current source inverter 400 has a two sectors, and third current source inverter 500 has fourteen sectors though implemented in a similar manner.

"S1S6" denotes a space vector corresponding to the specified switches, where S1 indicates third switch 126, S2 indicates eighth switch 136, S3 indicates fifth switch 130, S4 indicates fourth switch 128, S5 indicates seventh switch 134, S6 indicates sixth switch 132, S7 indicates first switch 114, and S8 indicates second switch 116. The pulses indicate when the respective switches are turned on. For example, "S1S6" indicates that the respective pair of switches third switch 126 and sixth switch 132 are in the on-state based on an on-state control signal provided by the respective PWM signal generator while a remainder of the half-bridge switches (e.g., first half-bridge 120, second half-bridge 122, and third half-bridge 124 of current source inverter 100) are in the off-state based on an off-state control signal provided by the respective PWM signal generator. As another example, "S7" indicates that first switch 114 is in the on-state based on an on-state control signal provided by the respective PWM signal generator. As yet another example, "S8" indicates that second switch 116 is in the on-state based on an on-state control signal provided by the respective PWM signal generator.

Figure 9:
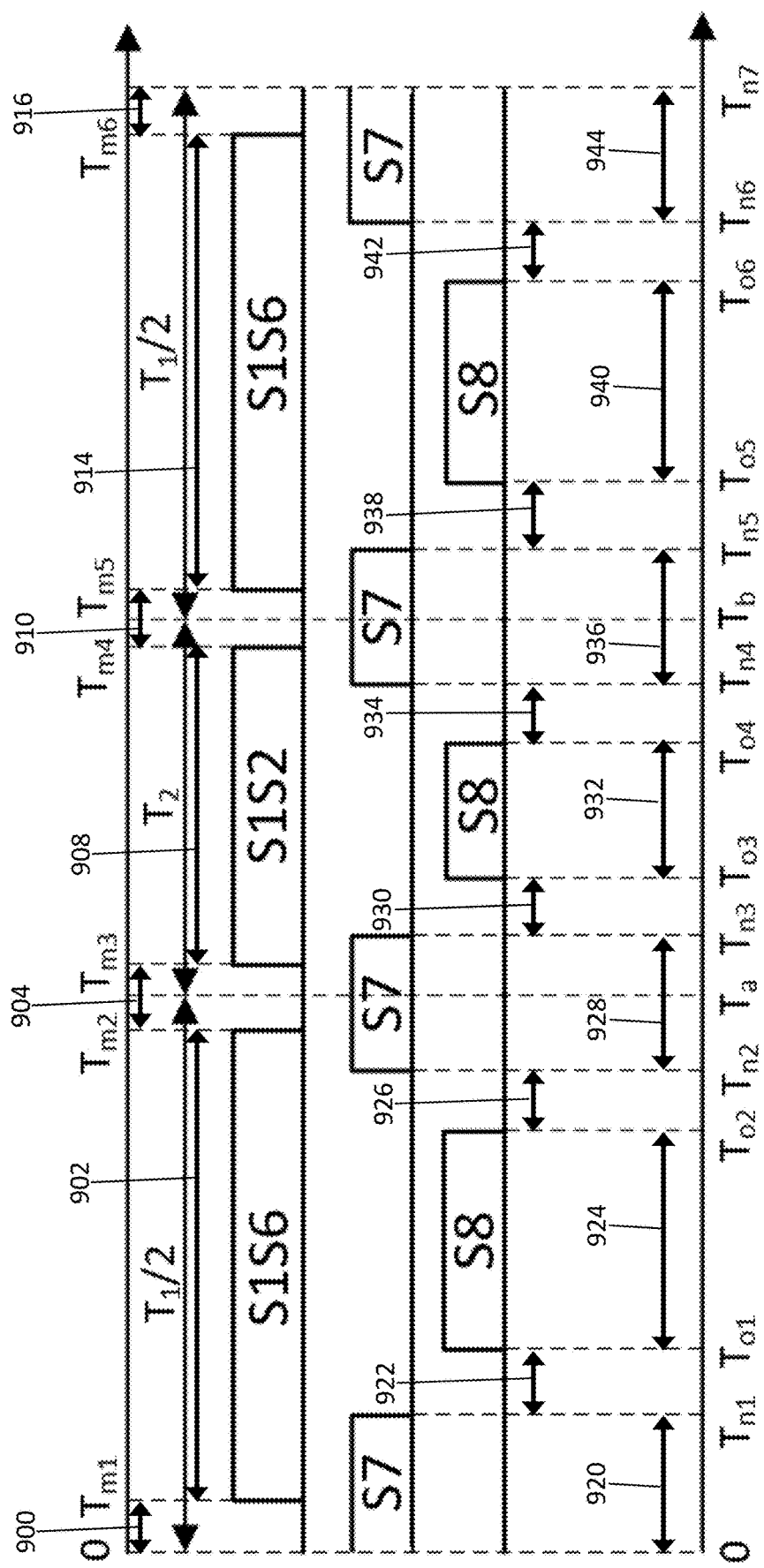
FIG. 9 is a timing chart for a control signal time period snapshot for the current source inverter of FIG. 1 in accordance with an illustrative embodiment.

Referring to FIG. 9, a timing chart for a control signal time period snapshot for current source inverter 100 is shown in accordance with an illustrative embodiment, when the current space vector resides in sector I. A switching loss in second switch 116 would be significant if it were operated alone without diode 118. However, the clamping action of diode 118 creates zero voltage switching (ZVS) conditions for second switch 116, thus, significantly reducing its total losses. A dead-band time (DB) is included between switching first switch 114 to the off-state and switching second switch 116 to the on-state to avoid a short-circuit. For example, a first DB 922 is inserted after switching first switch 114 to the off-state and before switching second switch 116 to the on-state; a second DB 926 is inserted after second switch 116 to the off-state and before switching first switch 114 to the on-state; a third DB 930 is inserted after switching first switch 114 to the off-state and before switching second switch 116 to the on-state; a fourth DB 934 is inserted after switching second switch 116 to the off-state and before switching first switch 114 to the on-state; a fifth DB 938 is inserted after switching first switch 114 to the off-state and before switching second switch 116 to the on-state; a sixth DB 942 is inserted after switching second switch 116 to the off-state and before switching first switch 114 to the on-state; etc.

A dead-time (DT) is included between switching from the off-state of a pair of the half-bridge switches to an on-state of a different pair of the half-bridge switches to avoid a short-circuit. For example, a first DT 900 is inserted before switching third switch 126 and sixth switch 132 to the on-state; a second DT 904 is inserted after switching third switch 126 and sixth switch 132 to the off-state and before switching third switch 126 and eighth switch 136 to the on-state; a third DT 910 is inserted after switching third switch 126 and eighth switch 136 to the off-state and before switching third switch 126 and sixth switch 132 to the on-state; a fourth DT 916 is inserted after switching third switch 126 and sixth switch 132 to the off-state and before switching another pair of half-bridge switches to the on-state; etc.

A time length of each on-state for each pair of the half-bridge switches (e.g., first half-bridge 120, second half-bridge 122, and third half-bridge 124 of current source inverter 100) is determined using a dwell time $T_{0*}$, $T_{1*}$, $T_{2*}$, computed for a total zero state, a first active state, and a second active state, respectively, implemented by a conventional CSI, for example, as described in B. Wu, *High-Power Converters and AC Drives*, Ch. 10, pp. 189-218, Wiley, 2006. The values indicated in FIG. 9 can be computed using $$T_s = \frac{1}{f_s}, \quad (1)$$

where $T_s$ is the inverter switching period of current source inverter 100, and $f_s$ is the switching frequency of current source inverter 100;

$$m_a = \frac{I_{ref}}{I_d}, \quad (2)$$

where $I_{ref}$ is a desired inverter output current waveform peak value, $I_d$ is a DC-link current value on source line 158, and $m_a$ is a modulation index that ranges from zero to one;

$$T_{1*} = m_a \cdot \sin\left(\frac{\pi}{6} - \theta\right) \cdot T_s, \quad (3)$$

where $T_{1*}$ is the conventional space vector dwell time in one inverter switching period $T_s$, without considering overlap time, and $\theta$ is the angle of the space vector;

$$T_{2*} = m_a \cdot \sin\left(\frac{\pi}{6} + \theta\right) \cdot T_s, \quad (4)$$

where $T_{2*}$ is the conventional space vector dwell time in one inverter switching period $T_s$, without considering overlap time;

$$T_{0*} = T_s - T_{1*} - T_{2*}, \quad (5)$$

where $T_{0*}$ is the conventional space vector zero state's dwell time in one inverter switching period $T_s$;

$$T_1 = T_{1*} + T_{0*}, \quad (6)$$

where $T_1$ is a first space vector dwell time in one inverter switching period $T_s$, without considering DT;

$$T_2 = T_{2*}, \quad (7)$$

where $T_2$ is a second space vector dwell time in one inverter switching period $T_s$, without considering DT;

$$T_a = \frac{T_1}{2}, \text{ and} \quad (8)$$

$$T_b = T_a + T_2. \quad (9)$$

Referring to FIG. 9, $$T_{m1} = \frac{T_{DT}}{2},$$

$$T_{m2} = T_a - \frac{T_{DT}}{2},$$

$$T_{m3} = T_a + \frac{T_{DT}}{2},$$

$$T_{m4} = T_b - \frac{T_{DT}}{2},$$

$$T_{m5} = T_b + \frac{T_{DT}}{2}, \text{ and}$$

$$T_{m6} = T_s - \frac{T_{DT}}{2}.$$

where $T_{DT}$ is the DT inserted between switching from the off-state of a pair of the half-bridge switches to an on-state of a different pair of the half-bridge switches. The value of $T_{DT}$ may be configurable as an input to control application 712. For example, first DT 900, second DT 904, third DT 910, and fourth DT 916 may be defined to have a common predefined value. After first DT 900, third switch 126 and sixth switch 132 (e.g., in sector I) switch to the on-state at $T_{m1}$. Third switch 126 and sixth switch 132 are in the on-state for a first on-time 902 and switch to the off-state at $T_{m2}$. After second DT 904, third switch 126 and eighth switch 136 switch to the on-state at $T_{m3}$. Third switch 126 and eighth switch 136 are in the on-state for a second on-time 908 and switch to the off-state at $T_{m4}$. After third DT 910, third switch 126 and sixth switch 132 switch to the on-state at $T_{m5}$. Third switch 126 and sixth switch 132 are in the on-state for a third on-time 914 and switch to the off-state at $T_{m6}$.

Relative to the timing for first switch 114, $$T_{n1} = \frac{T_{0*}}{4},$$

$$T_{n2} = T_a - \frac{T_{0*}}{8},$$

$$T_{n3} = T_a + \frac{T_{0*}}{8},$$

$$T_{n4} = T_b - \frac{T_{0*}}{8},$$

$$T_{n5} = T_b + \frac{T_{0*}}{8},$$

$$T_{n6} = T_s - \frac{T_{0*}}{4}, \text{ and}$$

$$T_{n7} = T_s.$$

As a result, a first on-time 920 for first switch 114 is $T_{n1}$ that is based on total zero state $T_{0*}$, a second on-time 928 for first switch 114 is $T_{n3}-T_{n2}$, a third on-time 936 for first switch 114 is $T_{n5}-T_{n4}$, a fourth on-time 944 for first switch 114 is $T_{n7}-T_{n6}$, etc. First switch 114 is switched on prior to, during, and after a change in state from either the on-state to the off-state or the off-state to the on-state of any of the half-bridge switches.

Relative to the timing for second switch 116, $T_{o1}=T_{n1}+T_{DB}$, $T_{o2}=T_{n2}-T_{DB}$, $T_{o3}=T_{n3}+T_{DB}$, $T_{o4}=T_{n4}-T_{DB}$, $T_{o5}=T_{n5}+T_{DB}$, $T_{o6}=T_{n6}-T_{DB}$, and $T_{n7}=T_s$, where $T_{DB}$ is the DB inserted between first switch 114 and second switch 116. Diode 118 has a higher conduction loss the larger $T_{DB}$ is. A first on-time 924 for second switch 116 is $T_{o2}-T_{o1}$, a second on-time 932 for second switch 116 is $T_{o4}-T_{o3}$, a third on-time 940 for second switch 116 is $T_{o6}-T_{o5}$, etc. Second switch 116 is switched to the on-state while any of the half-bridge switches is in an on-state and while first switch 114 is in the off-state while separated from the on-state of first switch 114 by $T_{DB}$ before the switch to the on-state of second switch 116 and $T_{DB}$ after the switch to the off-state of second switch 116. The on-time for second switch 116 varies as a function of the first space vector dwell time $T_1$ and the second space vector dwell time $T_2$.

Instead of commutation overlap as used in conventional CSI, current source inverter 100, second current source inverter 400, third current source inverter 500, fourth current source inverter 600, etc. use zero current switching (ZCS) for the half-bridge switches also referred to as current soft switching as shown in FIGS. 8A-8F and 9 due to use of first switch 114. Second switch 116 of current source inverter 100, second current source inverter 400, third current source inverter 500, fourth current source inverter 600, etc. also use zero voltage switching (ZVS) referred to as voltage soft switching as shown in FIGS. 8A-8F and 9 due to the clamping of diode 118. The ability to use ZCS and ZVS reduces switching losses.

First switch 114 provides ZCS across the half-bridge switches. First switch 114 transiently shorts the DC-link's positive terminal directly to its negative terminal. By shifting the responsibility for implementing the inverter zero states in the conventional CSI from the RB switches to the switching operation of first switch 114, zero switching loss is achieved for the half-bridge switches.

By adding second switch 116 along with diode 118, deadtime-based commutation that is widely used in VSIs can be reliably implemented for the half-bridge switches when using bidirectional switches without worrying about interphase short circuits. In contrast, this commutation problem can interfere with safe switching between the half-bridge switches for conventional CSI inverter topologies when bidirectional switches are used.

Figure 10:
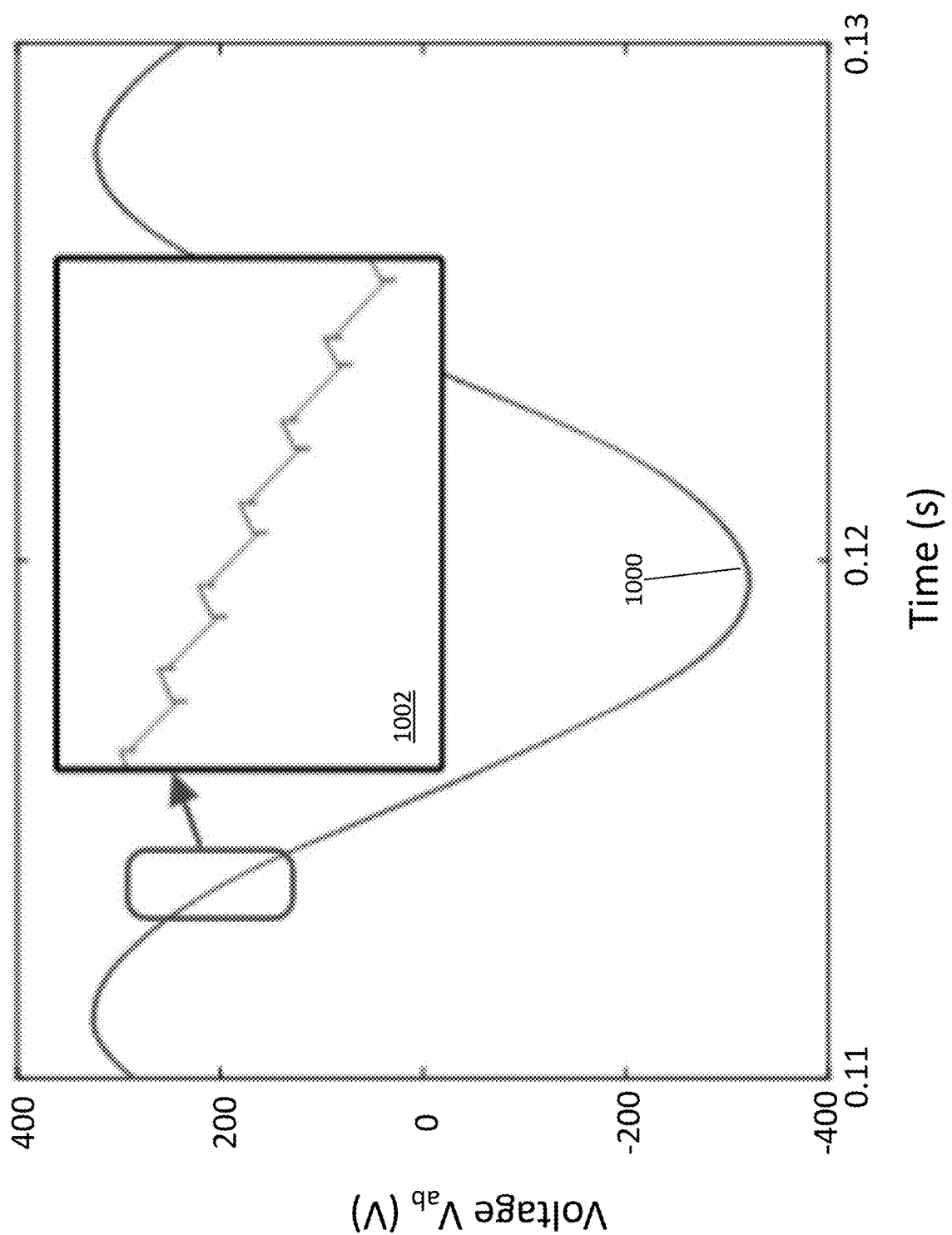
FIG. 10 shows a simulated first phase-phase output voltage generated by the power conversion system of FIG. 7 in accordance with an illustrative embodiment.
Figure 11:
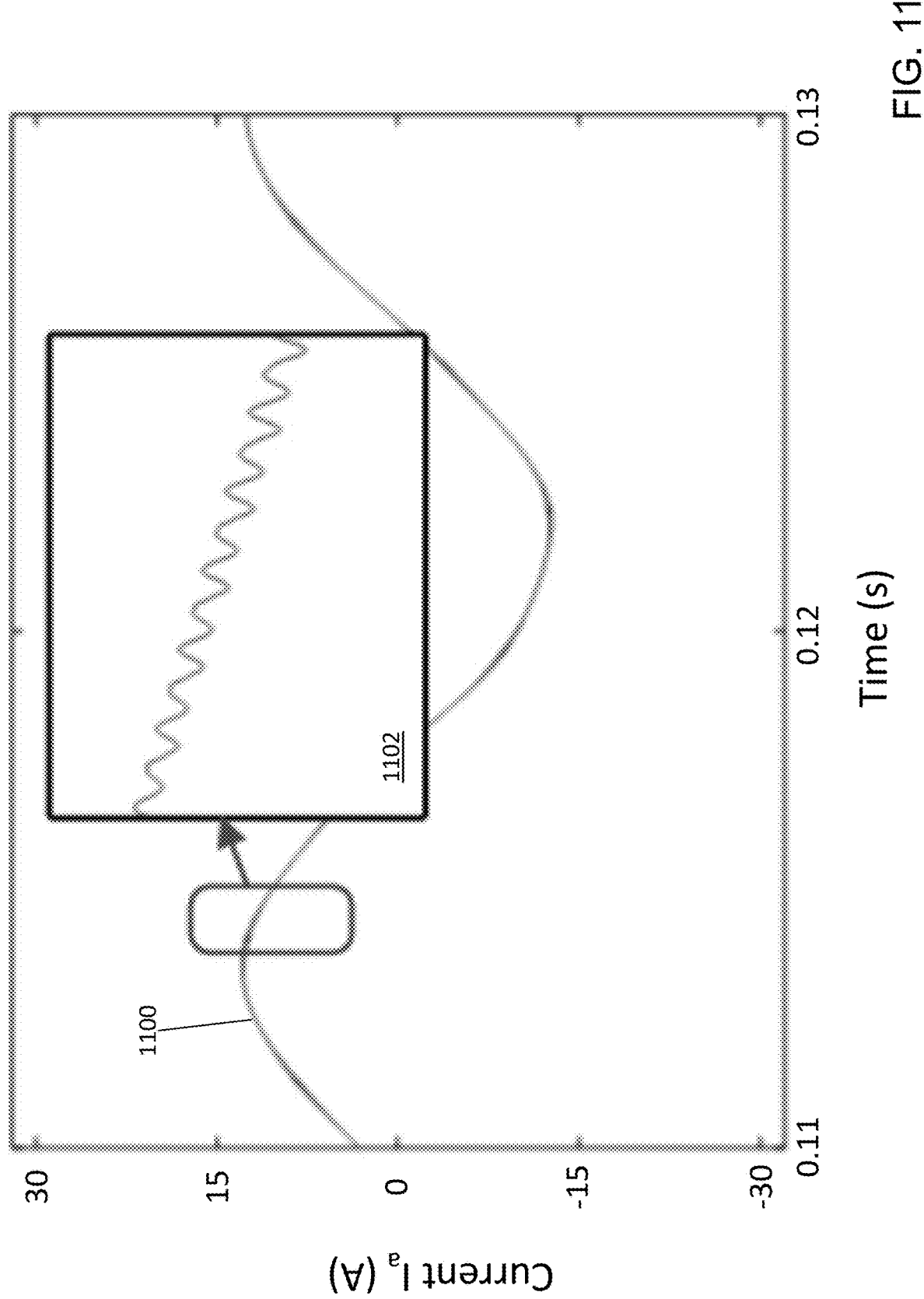
FIG. 11 shows a simulated first phase output current generated by the power conversion system of FIG. 7 in accordance with an illustrative embodiment.

Referring to FIG. 10, a simulated first phase-phase output voltage generated by power conversion system 700 is shown by simulated phase-phase output voltage curve 1000 in accordance with an illustrative embodiment. A window 1002 shows a zoomed portion of simulated phase-phase output voltage curve 1000. Referring to FIG. 11, a simulated first phase output current generated by power conversion system 700 is shown by simulated phase output current curve 1100 in accordance with an illustrative embodiment. A window 1102 shows a zoomed portion of simulated phase output current curve 1100. The simulated power conversion system 700 generated sinusoidal first phase-phase output voltage and first phase output current. The simulated power conversion system 700 was operated at 3 kilowatts (kW) with 230 volts root-mean-square ($V_{rms}$) line-line voltage and 97.5 kHz switching frequency $f_s$. The simulated inverter efficiency for the specified operating condition reached 98.1%, with a switching loss for first switch 114 of 9.4 watts (W), a conduction loss for the half-bridge switches of 30.8 W, for first switch 114 of 1.99 W, for diode 118 of 0.2 W, for second switch 116 of 4.4 W, for inductor 104 of 6.6 W, for capacitive filter 106 of 3.1 W. As expected, only first switch 114 exhibited any switching loss since the half-bridge switches achieved ZCS and second switch 116 achieved ZVS.

Figure 12:
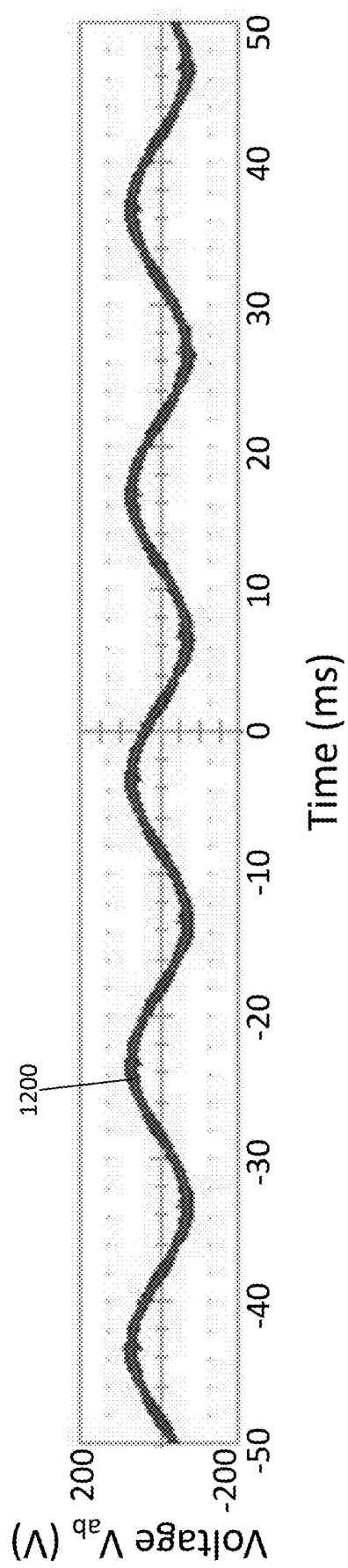
FIG. 12 shows a measured first phase-phase output voltage generated by the power conversion system of FIG. 7 in accordance with an illustrative embodiment.
Figure 13:
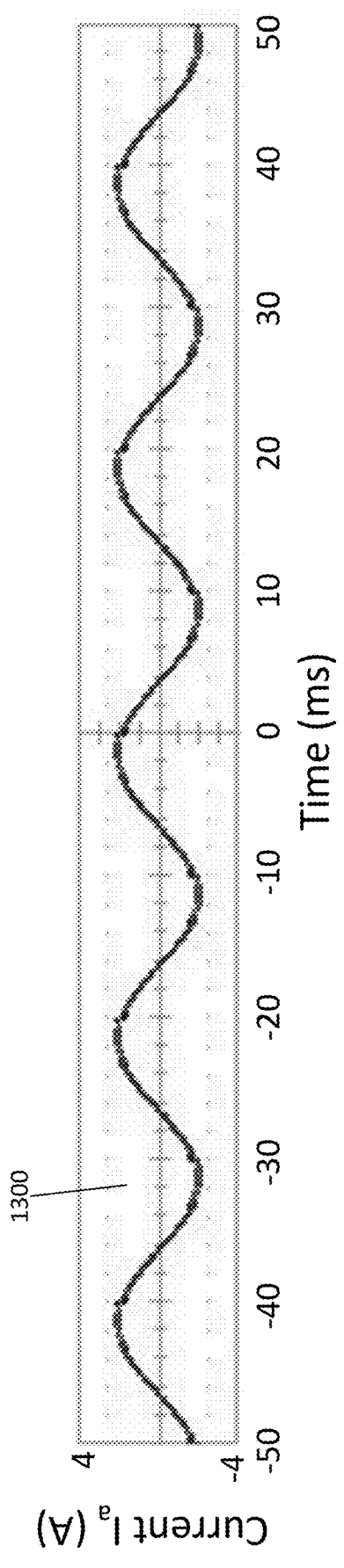
FIG. 13 shows a measured first phase output current generated by the power conversion system of FIG. 7 in accordance with an illustrative embodiment.

Referring to FIG. 12, a measured first phase-phase output voltage generated by power conversion system 700 is shown by measured phase-phase output voltage curve 1200 in accordance with an illustrative embodiment. Referring to FIG. 13, a measured first phase output current generated by power conversion system 700 is shown measured phase output current curve 1300 in accordance with an illustrative embodiment. The implemented power conversion system 700 was operated at 150 W with 55 $V_{rms}$ line-line voltage and a 20 kHz switching frequency $f_s$ because a microcontroller was not available that could achieve a simulated 97.5 kHz switching frequency. Both the measured first phase-phase output voltage and the measured first phase output current are sinusoidal though they would be more sinusoidal with a higher switching frequency.

Current source inverter 100, second current source inverter 400, third current source inverter 500, and fourth current source inverter 600 simultaneously maintain the advantages of current source inverters over voltage source inverters when paired with bidirectional switches. The addition of first switch 114, second switch 116, and diode 118 to the half-bridge switches supports very fast switching speeds when implemented using WBG transistors, making it possible to reduce a size of inductor 104 and of the capacitors of capacitive filter 106, and, consequently, to achieve a high power density. Current source inverter 100, second current source inverter 400, third current source inverter 500, and fourth current source inverter 600 achieve sinusoidal output voltage and current waveforms that improve motor winding insulation life and suppress significant EMI issues that are far worse in VSIs. The replacement of DC-link capacitors in VSIs with inductor 104 in CSIs can significantly improve a maximum temperature limit and a lifetime of a motor drive system of AC load 716.

The availability of high-performance WBG switches is opening new opportunities for CSI motor drives by significantly raising the switching frequency and lowering conduction losses. Current source inverter 100, second current source inverter 400, third current source inverter 500, and fourth current source inverter 600 are tailored for using WBG-based BD switches with the resulting low switching losses. As a result, current source inverter 100, second current source inverter 400, third current source inverter 500, and fourth current source inverter 600 are well-positioned to significantly boost an adoption rate of adjustable-speed motor drives for use with electric machines saving large amounts of energy and greenhouse gas emissions.

As used in this disclosure, the term "connect" indicates an electrical connection whether by wire or by air or some other medium that conducts an electrical signal. The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A switching circuit for a current source inverter comprising:
    a diode comprising an anode and a cathode;
    a semiconductor switch comprising a first terminal, a second terminal, and a third terminal, wherein the semiconductor switch is configured to conduct a first current from the second terminal to the third terminal of the semiconductor switch when a first on-state signal is sent to the first terminal of the semiconductor switch, wherein the anode of the diode is connected to the second terminal of the semiconductor switch and the cathode of the diode is connected to the third terminal of the semiconductor switch, wherein the semiconductor switch is not a bidirectional switch;
    a first bidirectional switch comprising a first terminal, a second terminal, and a third terminal, wherein the anode of the diode is connected to the second terminal of the first bidirectional switch, wherein the third terminal is connected to a first line;
    a first half-bridge comprising a second bidirectional switch comprising a first terminal, a second terminal, and a third terminal and a third bidirectional switch comprising a first terminal, a second terminal, and a third terminal, wherein the second bidirectional switch and the third bidirectional switch are connected in series between a second line and the first line;
    a second half-bridge comprising a fourth bidirectional switch comprising a first terminal, a second terminal, and a third terminal and a fifth bidirectional switch comprising a first terminal, a second terminal, and a third terminal, wherein the fourth bidirectional switch and the fifth bidirectional switch are connected in series between the second line and the first line,
    wherein a respective bidirectional switch is configured to conduct a second current from the second terminal of the respective bidirectional switch to the third terminal of the respective bidirectional switch or from the third terminal of the respective bidirectional switch to the second terminal of the respective bidirectional switch when a second on-state signal is sent to the first terminal of the respective bidirectional switch,
    wherein the second line is connected to the cathode of the diode,
    wherein the respective bidirectional switch is configured to block a voltage and a current when an off-state signal is sent to the first terminal of the respective bidirectional switch; and
    a controller configured to
        determine a first timing of the second on-state signal to the second bidirectional switch, the third bidirectional switch, the fourth bidirectional switch, and the fifth bidirectional switch based on a switching frequency, on a predefined output current peak value, and on a direct current (DC)-link current value received from a DC source when the current source inverter is connected to the DC source;
        send the second on-state signal to the second bidirectional switch, the third bidirectional switch, the fourth bidirectional switch, and the fifth bidirectional switch based on the determined first timing;
        determine a second timing of the second on-state signal to the first bidirectional switch;
        send the second on-state signal to the first bidirectional switch based on the determined second timing, wherein the second on-state signal is sent to the first bidirectional switch prior to, during, and after a change in state of any of the second bidirectional switch, the third bidirectional switch, the fourth bidirectional switch, and the fifth bidirectional switch;
        determine a third timing of the first on-state signal; and
        send the first on-state signal to the semiconductor switch based on the determined third timing, wherein the first on-state signal is sent to the semiconductor switch when any of the second bidirectional switch, the third bidirectional switch, the fourth bidirectional switch, and the fifth bidirectional switch are in the on-state based on the determined first timing and when the first bidirectional switch is in the off-state for a dead band time period based on the determined second timing.

2. The switching circuit of claim 1, wherein the semiconductor switch is a type of semiconductor selected from the group consisting of a metal-oxide-semiconductor field-effect transistor and a high electron mobility transistor.

3. The switching circuit of claim 1, wherein the semiconductor switch is configured to block a positive voltage applied between the third terminal and the second terminal of the semiconductor switch when an off-state signal is sent to the first terminal of the semiconductor switch.

4. The switching circuit of claim 1, further comprising:
    a third half-bridge comprising a sixth bidirectional switch comprising a first terminal, a second terminal, and a third terminal and a seventh bidirectional switch comprising a first terminal, a second terminal, and a third terminal, wherein the sixth bidirectional switch and the seventh bidirectional switch are connected in series between the second line and the first line.

5. The switching circuit of claim 4, wherein the controller is further configured to select a first pair of the second bidirectional switch, the third bidirectional switch, the fourth bidirectional switch, the fifth bidirectional switch, the sixth bidirectional switch, and the seventh bidirectional switch that are in different half-bridges of the first half-bridge, the second half-bridge, and the third half-bridge to which to send the second on-state signal based on the determined first timing, wherein the second on-state signal is sent to the selected first pair based on the determined first timing.

6. The switching circuit of claim 5, wherein the controller is further configured to:
   determine a fourth timing of the second on-state signal to the second bidirectional switch, the third bidirectional switch, the fourth bidirectional switch, the fifth bidirectional switch, the sixth bidirectional switch, and the seventh bidirectional switch based on the switching frequency, on the predefined output current peak value, and on the DC-link current value received from the DC source when the current source inverter is connected to the DC source;
   select a second pair of the second bidirectional switch, the third bidirectional switch, the fourth bidirectional switch, the fifth bidirectional switch, the sixth bidirectional switch, and the seventh bidirectional switch that are in different half-bridges of the first half-bridge, the second half-bridge, and the third half-bridge to which to send the second on-state signal based on the determined fourth timing, wherein the selected second pair includes a single switch from the first pair and a single switch from a half-bridge not included in the first pair;
   send the second on-state signal to the selected second pair based on the determined fourth timing.

7. The switching circuit of claim 6, wherein the controller is further configured to send the off-state signal to the selected first pair for a dead time period after completion of the determined first timing and to send the off-state signal to the selected second pair for the dead time period after completion of the determined second timing.

8. The switching circuit of claim 7, wherein the controller is further configured to send the second on-state signal to the selected first pair based on the determined first timing after expiration of the dead time period after completion of the determined second timing.

9. The switching circuit of claim 1, wherein the respective bidirectional switch further comprises a fourth terminal, wherein the respective bidirectional switch is configured to conduct the second current from the second terminal of the respective bidirectional switch to the third terminal of the respective bidirectional switch when the second on-state signal is sent to the first terminal of the respective bidirectional switch, wherein the respective bidirectional switch is configured to conduct the second current from the third terminal of the respective bidirectional switch to the second terminal of the respective bidirectional switch when the second on-state signal is sent to the fourth terminal of the respective bidirectional switch.

10. The switching circuit of claim 1, wherein the first bidirectional switch, the second bidirectional switch, the third bidirectional switch, the fourth bidirectional switch, and the fifth bidirectional switch include a transistor selected from the group consisting of a gallium nitride high electron mobility transistor and a silicon-carbide metal-oxide-semiconductor field-effect transistor.

11. The switching circuit of claim 10, wherein the first bidirectional switch includes the gallium nitride high electron mobility transistor, wherein the second bidirectional switch, the third bidirectional switch, the fourth bidirectional switch, and the fifth bidirectional switch include the silicon-carbide metal-oxide-semiconductor field-effect transistor.

12. A current source inverter comprising:
   an inductor;
   a filter;
   a switching circuit connected between the inductor and the filter, the switching circuit comprising
      a diode comprising an anode and a cathode;
      a semiconductor switch comprising a first terminal, a second terminal, and a third terminal, wherein the semiconductor switch is configured to conduct a first current from the second terminal to the third terminal of the semiconductor switch when a first on-state signal is sent to the first terminal of the semiconductor switch, wherein the anode of the diode is connected to the second terminal of the semiconductor switch and the cathode of the diode is connected to the third terminal of the semiconductor switch, wherein the semiconductor switch is not a bidirectional switch;
      a first bidirectional switch comprising a first terminal, a second terminal, and a third terminal, wherein the anode of the diode is connected to the second terminal of the first bidirectional switch, wherein the third terminal is connected to a first line;
      a first half-bridge comprising a second bidirectional switch comprising a first terminal, a second terminal, and a third terminal and a third bidirectional switch comprising a first terminal, a second terminal, and a third terminal, wherein the second bidirectional switch and the third bidirectional switch are connected in series between a second line and the first line; and
      a second half-bridge comprising a fourth bidirectional switch comprising a first terminal, a second terminal, and a third terminal and a fifth bidirectional switch comprising a first terminal, a second terminal, and a third terminal, wherein the fourth bidirectional switch and the fifth bidirectional switch are connected in series between the second line and the first line,
      wherein a respective bidirectional switch is configured to conduct a second current from the second terminal of the respective bidirectional switch to the third terminal of the respective bidirectional switch or from the third terminal of the respective bidirectional switch to the second terminal of the respective bidirectional switch when a second on-state signal is sent to the first terminal of the respective bidirectional switch,
      wherein the second line is connected to the cathode of the diode,
      wherein the respective bidirectional switch is configured to block a voltage and a current when an off-state signal is sent to the first terminal of the respective bidirectional switch; and
   a controller configured to
      determine a first timing of the second on-state signal to the second bidirectional switch, the third bidirectional switch, the fourth bidirectional switch, and the fifth bidirectional switch based on a switching frequency, on a predefined output current peak value, and on a direct current (DC)-link current value received from a DC source when the current source inverter is connected to the DC source;
      send the second on-state signal to the second bidirectional switch, the third bidirectional switch, the fourth bidirectional switch, and the fifth bidirectional switch based on the determined first timing;
      determine a second timing of the second on-state signal to the first bidirectional switch;
      send the second on-state signal to the first bidirectional switch based on the determined second timing, wherein the second on-state signal is sent to the first bidirectional switch prior to, during, and after a change in state of any of the second bidirectional switch, the third bidirectional switch, the fourth bidirectional switch, and the fifth bidirectional switch;

determine a third timing of the first on-state signal; and send the first on-state signal to the semiconductor switch based on the determined third timing, wherein the first on-state signal is sent to the semiconductor switch when any of the second bidirectional switch, the third bidirectional switch, the fourth bidirectional switch, and the fifth bidirectional switch are in the on-state based on the determined first timing and when the first bidirectional switch is in the off-state for a dead band time period based on the determined second timing.

13. The current source inverter of claim 12, wherein the semiconductor switch is a type of semiconductor selected from the group consisting of a metal-oxide-semiconductor field-effect transistor and a high electron mobility transistor.

14. The current source inverter of claim 12, wherein the semiconductor switch is configured to block a positive voltage applied between the third terminal and the second terminal of the semiconductor switch when an off-state signal is sent to the first terminal of the semiconductor switch.

15. The current source inverter of claim 12, wherein the respective bidirectional switch further comprises a fourth terminal, wherein the respective bidirectional switch is configured to conduct the second current from the second terminal of the respective bidirectional switch to the third terminal of the respective bidirectional switch when the second on-state signal is sent to the first terminal of the respective bidirectional switch, wherein the respective bidirectional switch is configured to conduct the second current from the third terminal of the respective bidirectional switch to the second terminal of the respective bidirectional switch when the second on-state signal is sent to the fourth terminal of the respective bidirectional switch.

16. The current source inverter of claim 12, wherein the first bidirectional switch, the second bidirectional switch, the third bidirectional switch, the fourth bidirectional switch, and the fifth bidirectional switch include transistors selected from the group consisting of a gallium nitride high electron mobility transistor and a silicon-carbide metal-oxide-semiconductor field-effect transistor.

17. The current source inverter of claim 16, wherein the first bidirectional switch includes the gallium nitride high electron mobility transistor, wherein the second bidirectional switch, the third bidirectional switch, the fourth bidirectional switch, and the fifth bidirectional switch include the silicon-carbide metal-oxide-semiconductor field-effect transistor.

18. The current source inverter of claim 12, further comprising:

a third half-bridge comprising a sixth bidirectional switch comprising a first terminal, a second terminal, and a third terminal and a seventh bidirectional switch comprising a first terminal, a second terminal, and a third terminal, wherein the sixth bidirectional switch and the seventh bidirectional switch are connected in series between the second line and the first line.

19. The current source inverter of claim 18, wherein the controller is further configured to select a first pair of the second bidirectional switch, the third bidirectional switch, the fourth bidirectional switch, the fifth bidirectional switch, the sixth bidirectional switch, and the seventh bidirectional switch that are in different half-bridges of the first half-bridge, the second half-bridge, and the third half-bridge to which to send the second on-state signal based on the determined first timing, wherein the second on-state signal is sent to the selected first pair based on the determined first timing.

20. The current source inverter of claim 19, wherein the controller is further configured to:

determine a fourth timing of the second on-state signal to the second bidirectional switch, the third bidirectional switch, the fourth bidirectional switch, the fifth bidirectional switch, the sixth bidirectional switch, and the seventh bidirectional switch based on the switching frequency, on the predefined output current peak value, and on the DC-link current value received from the DC source when the current source inverter is connected to the DC source;

select a second pair of the second bidirectional switch, the third bidirectional switch, the fourth bidirectional switch, the fifth bidirectional switch, the sixth bidirectional switch, and the seventh bidirectional switch that are in different half-bridges of the first half-bridge, the second half-bridge, and the third half-bridge to which to send the second on-state signal based on the determined fourth timing, wherein the selected second pair includes a single switch from the first pair and a single switch from a half-bridge not included in the first pair;

send the second on-state signal to the selected second pair based on the determined fourth timing.

* * * * *

UNITED STATES PATENT AND TRADEMARK OFFICE
CERTIFICATE OF CORRECTION

PATENT NO. : 11,387,746 B2
APPLICATION NO. : 16/354453
DATED : July 12, 2022
INVENTOR(S) : Hang Dai et al.

Page 1 of 1

It is certified that error appears in the above-identified patent and that said Letters Patent is hereby corrected as shown below:

In the Specification

Column 8, Line 50:
Delete the phrase "Conyers." and replace with --Convers.--.

Column 8, Line 66:
Delete the phrase "mΩm2" and replace with --mΩcm2--.

Column 15, Line 63:
Delete the phrase "$T_{0*} = T_s - T_{1*}T_{2*}$," and replace with --$T_{0*} = T_s - T_{1*} - T_{2*}$,--.

Signed and Sealed this
Sixth Day of December, 2022

Katherine Kelly Vidal
*Director of the United States Patent and Trademark Office*